(12) United States Patent
Meretska et al.

(10) Patent No.: US 11,860,336 B2
(45) Date of Patent: Jan. 2, 2024

(54) HIGH-ASPECT RATIO METALENS

(71) Applicant: PRESIDENT AND FELLOWS OF HARVARD COLLEGE, Cambridge, MA (US)

(72) Inventors: Maryna Leonidivna Meretska, Cambridge, MA (US); Soon Wei Daniel Lim, Cambridge, MA (US); Federico Capasso, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 57 days.

(21) Appl. No.: 17/512,560

(22) Filed: Oct. 27, 2021

(65) Prior Publication Data

US 2022/0128734 A1 Apr. 28, 2022

Related U.S. Application Data

(60) Provisional application No. 63/106,825, filed on Oct. 28, 2020.

(51) Int. Cl.
*G02B 1/00* (2006.01)
*G02B 5/18* (2006.01)
*B82Y 20/00* (2011.01)

(52) U.S. Cl.
CPC ............ *G02B 1/002* (2013.01); *G02B 5/1833* (2013.01); *B82Y 20/00* (2013.01)

(58) Field of Classification Search
CPC ........ G02B 1/002; G02B 5/1833; G02B 1/00; G02B 5/00; G02B 27/00; G02B 27/0025; G02B 2207/101; B82Y 20/00

USPC .......................................... 359/355, 350, 356
See application file for complete search history.

(56) References Cited

U.S. PATENT DOCUMENTS 5,973,316 A * 10/1999 Ebbesen ................ B82Y 35/00
430/5

OTHER PUBLICATIONS

A. Marechal: "Etude des effets combines de la diffraction et des aberrations geometriques sur l'image d'un point lumineux" Rev. d'Optique Theoretique Instrum. 26, 257-277 (1947).(23 pages).
AA Krokhin: "Long-wavelength limit (homogenization) for two-dimensional photonic crystals" Phys. Rev. B—Condens. Matter Mater. Phys. 65, 1-17 (2002)(2 pages).

(Continued)

*Primary Examiner* — Arnel C Lavarias
(74) *Attorney, Agent, or Firm* — FOLEY & LARDNER LLP

(57) ABSTRACT

An optical device includes a membrane. The membrane includes a plurality of apertures extending at least partially through a thickness of the membrane. The membrane is configured to structure incoming light having a wavelength to produce modified light. The wavelength of the incoming light in vacuum is in a range of ultraviolet light and mid-infrared. The membrane is configured to reflect the modified light away from the membrane or transmit the modified light through the membrane. A separation between each of the plurality of apertures is subwavelength relative to the wavelength of the incoming light. A width of each of the plurality of apertures is subwavelength relative to the wavelength of the incoming light. A length of each of the plurality of apertures is wavelength-scale relative to the wavelength of the incoming light.

28 Claims, 17 Drawing Sheets

(56) References Cited

OTHER PUBLICATIONS

Abdoulaye Ndao et al.: "Octave bandwith photonic fishnet-achromatic-metalens" 10.1038 s41467-020-17015-9 Nature Communications; 2020 (6 pages).
Alan Zhan et al.: "Low-Contrast Dielectric Metasurface Optics" ACS Photonics 3, 209-214 (2016)m (15 pages).
Arvind S. Marathay et al.: "Vector diffraction theory for electromagnetic waves" J. Opt. Soc. Am. A 18, 2585 (2001)(9 pages).
Benedikt Groever et al.: "Meta-lens doublet in the visible region" Nano Lett. 17, 4902-4907 (2017). (6 pages).
Bo Wang et al.: "Visible-Frequency Dielectric Metasurfaces for Multiwavelength Achromatic and Highly Dispersive Holograms" Nano Lett. 16, 5235-5240 (2016)(8 pages).
C.R. Simovski: "Material parameters of metamaterials (a Review)" Opt. Spectrosc. (English Transl. Opt. i Spektrosk. 107, 726-753 (2009). (1 page).
Ciyou Zhu et al.: "L-BFGS-B: Fortran Subroutines for Large-Scale Bound-Constrained Optimization" Algorithm 778: ACM Trans. Math. Softw. 23, 550-560 (1997). (17 pages).
Ethan Schonbrunr et al.: "Reconfigurable imaging systems using elliptical nanowires" Nano Lett. 11, 4299-4303 (2011), Sep. 16, 2011 (5 pages).
Felicitas Walters et al.: "Ultrathin Nonlinear Metasurface for Optical Image Encoding" Nano Lett. 17, 3171-3175 (2017). (4 pages).
Francesco Aieta et al.: "Aberration-free ultrathin flat lenses and axicons at telecom wavelengths based on plasmonic metasurfaces" Nano Lett. 12, 4932-4936 (2012)(12 pages).
Fu Min Huang et al.: "Focusing of light by a nano-hole array" Appl. Phys. Lett. 90, 091119 (2007). (9 pages).
Gwanho Yoon et al.: "Single-step manufacturing of hierarchical dielectric metalens in the visible" Nat. Commun. 11, 1-10 (2020); May 8, 2020 (10 pages).
Haofei Shi et al.: "Beam manipulating by metallic nano-slits with variant widths" Opt. Express 13, 6815 (2005)Aug. 19, 2005, Chinese academy of Sciences, Chengdu, Sichuan Province, China (6 pages).
J.P. Balthasar Mueller et al.: "Ultracompact metasurface in-line polarimeter" Optica 3, 42 (2016) (6 pages).
J.P. Hugonin et al.: "Reticolo software for grating analysis" (2005). (55 pages).
Jun Rong Ong et al.: "Freestanding dielectric nanohole array metasurface for mid-infrared wavelength applications" vol. 42, No. 13; Jul. 1, 2017; Optics Letters 26.39 (4 pages).
Leilei Yin et al.: "Subwavelength focusing and guiding of surface plasmons" Nano Lett. 5, 1399-1402 (2005) (4 pages).
Lianlin Li et al.: "Electromagnetic reprogrammable coding-metasurface holograms" Nat. Commun. 8, 1-7 (2017)(7 pages).
Lianwei Wang et al.: "High aspect ratio through-wafer interconnections for 3D-microsystems" Proc. IEEE Micro Electro Mech. Syst. 634-637 (2003). (3 pages).

Lieven Verslegers et al.: "Planar lenses based on nanoscale slit arrays in a metallic film" Nano Lett. 9, 235-238 (2009)Jan. 21, 2009 (5 Pages).
M. Q. Mehmood et al.: "Visible-Frequency Metasurface for Structuring and Spatially Multiplexing Optical Vortices" Adv. Mater. 28, 2533-2539 (2016)(7 pages).
Mohammadreza Khorasaninejad et al.: "Metalenses at visible wavelengths: Diffraction-limited focusing and subwavelength resolution imaging" Science 352, 1190-1194 (2016). (7 pages).
Mohammadreza Khorasaninejad et al.: "Metalenses: Versatile multifunctional photonic components" Science 358, eaam8100 (2017), Dec. 1, 2017; (10 pages).
Nanfang Yu et al.: "Light Propagation with Phase Discontinuities: Generalized Laws of Reflection and Refraction" Science 334, 333-337 (2011)(6 pages).
Noah A. Rubin et al.: "Matrix Fourier optics enables a compact full-Stokes polarization camera"; Science 365, eaax1839 (2019); Jul. 5, 2019 (10 pages).
Park, J. et al. "All-Glass, Large Metalens at Visible Wavelength using Deep-Ultraviolet Projection Lithography"; Nano Letters, 19, 12, Nov. 14, 2019, pp. 8673-8682, 10 pages.
Philippe Lalanne "On the effective medium theory of subwavelength periodic structures" J. Mod. Opt. 43, 2063-2085 (1996). (1 page).
Philippe Lalanne: "Optical properties of deep lamellar gratings: A coupled bloch-mode insight" J. Light. Technol. 24, 2442-2449 (2006)(8 pages).
Richard H. Byrd: "A Limited Memory Algorithm for Bound Constrained Optimization" Siam J. Sci. Comput. 16, 1190-1208 (1995). (22 pages).
Robert C. Devlin et al.: "Broadband high-efficiency dielectric metasurfaces for the visible spectrum" Proc. Natl. Acad. Sci. U. S. A. 113, 10473-10478 (2016). (6 pages).
Sang-Gil Park et al.: "Subwavelength silicon through-hole arrays as an all-dielectric broadband terahertz gradient index metamaterial" Appl. Phys. Lett. 105, (2014). (5 pages).
Shrestha, S. et al., "Broadband achromatic dielectric metalenses", Light: Science & Applications (2018)7:85, Nov. 7, 2018, 11 pages.
Ting Hu et al. "CMOS-compatible a-Si metalenses on a 12-inch glass wafer for fingerprint imaging" Nanophotonics 9, 823-830 (2020); Jan. 26, 2020; (8 pages).
Wei Ting Chen et al.: "A broadband achromatic metalens for focusing and imaging in the visible" Nat. Nanotechnol. 13, 220-226 (2018). (31 pages).
Wei Ting Chen et al.: "Flat optics with dispersion-engineered metasurfaces" Nat. Rev. Mater. 13, 139-150 (2020). (17 pages).
Wei Ting Chen et al.: "Generation of wavelength-independent subwavelength Bessel beams using metasurfaces" Light Sci. Appl. 6, e16259-e16259 (2017)(6 pages).
Yuanmu Yang et al.: "Dielectric meta-reflectarray for broadband linear polarization conversion and optical vortex generation" Nano Lett. 14, 1394-1399 (2014). (11 pages).
Zhaowei Liu et al.: "Focusing surface plasmons with a plasmonic lens" Nano Lett. 5, 1726-1729 (2005). (4 pages).

* cited by examiner

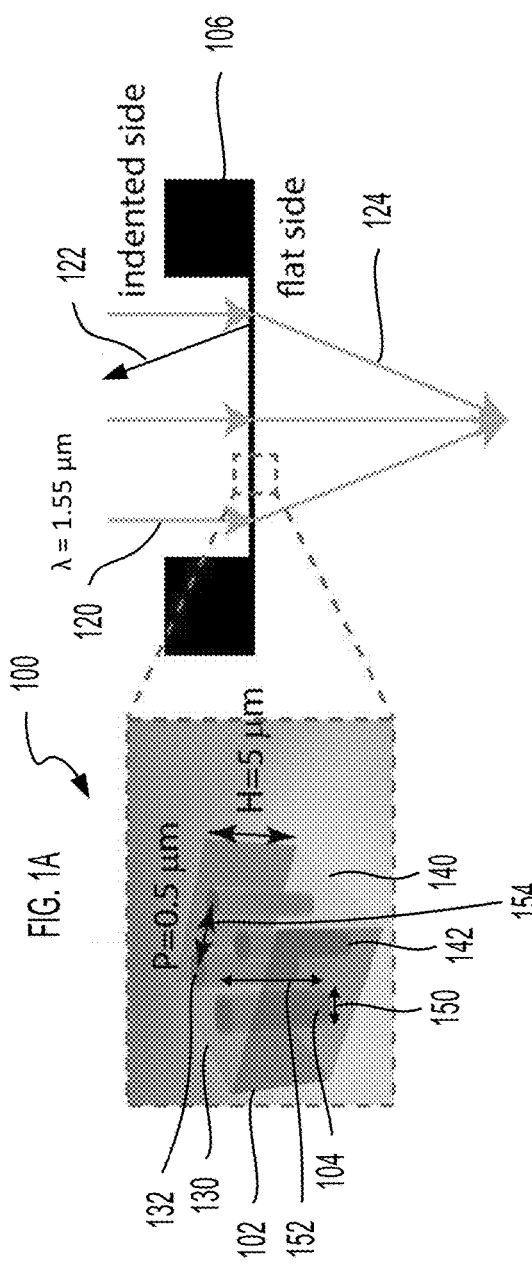
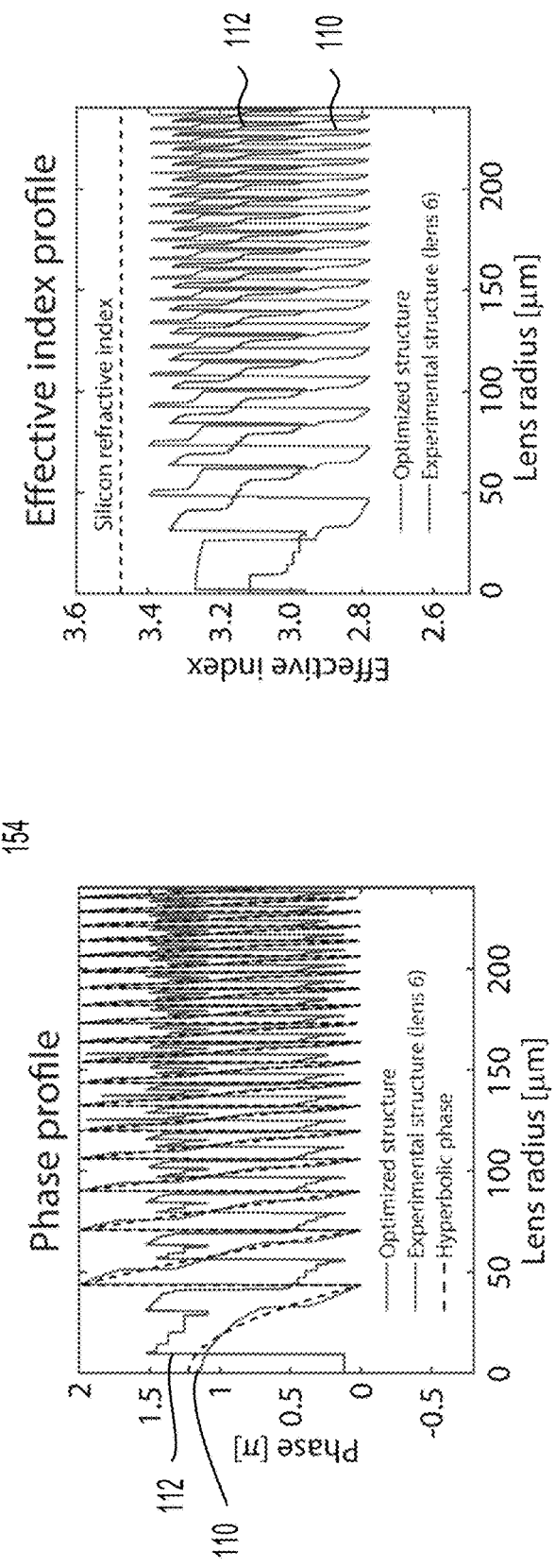
FIG. 1A
FIG. 1B
FIG. 1C

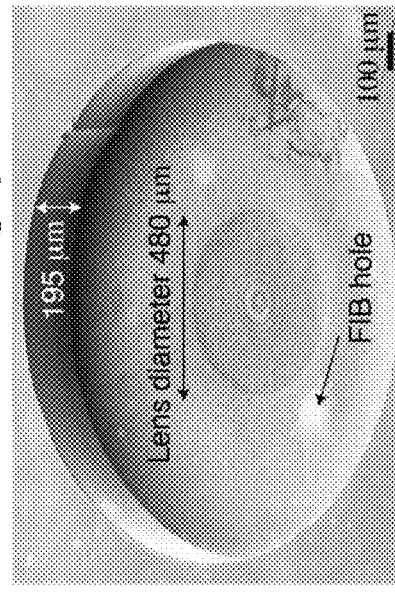
FIG. 2A
FIG. 2B
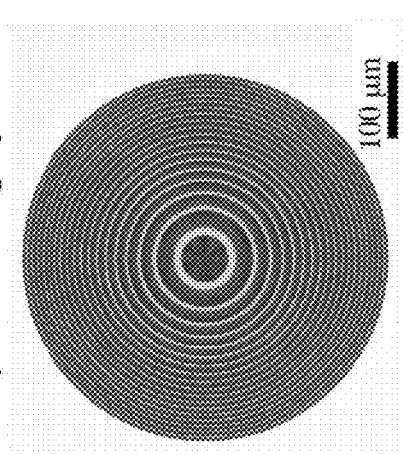
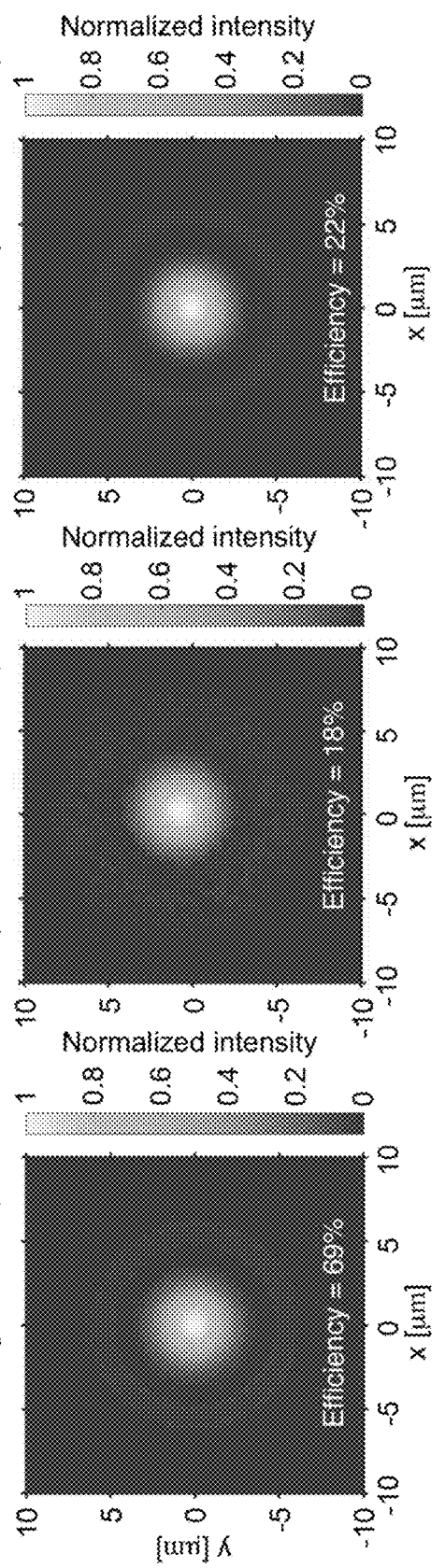
FIG. 2C
FIG. 2D
FIG. 2E

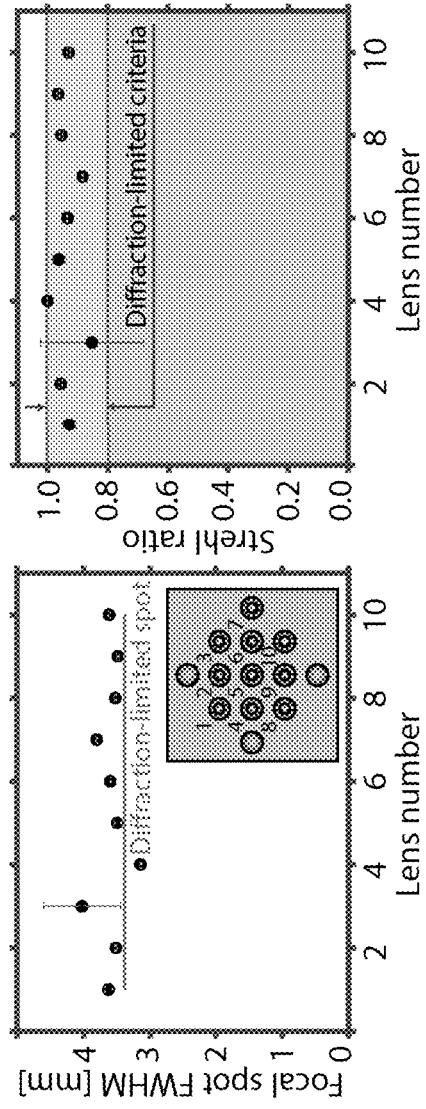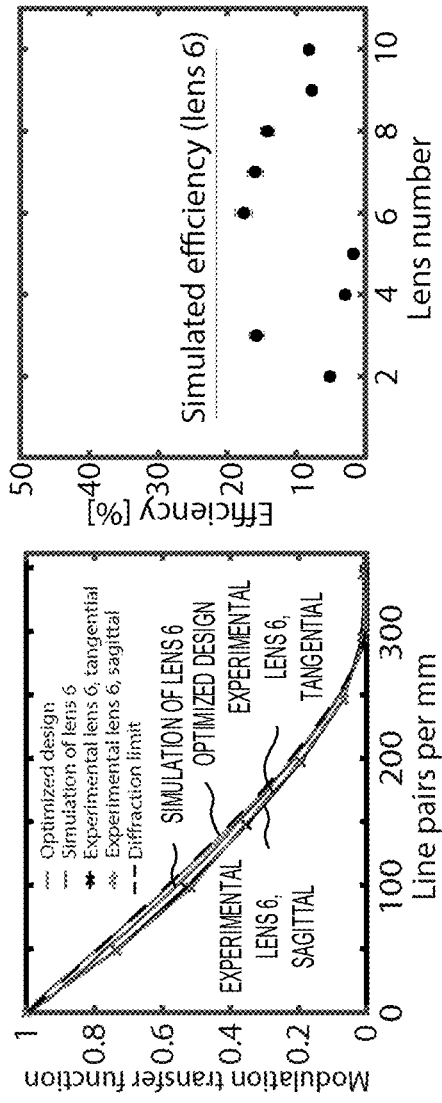
FIG. 3A
FIG. 3B
FIG. 3C
FIG. 3D

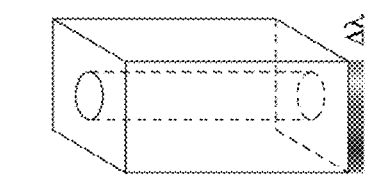
FIG. 6A
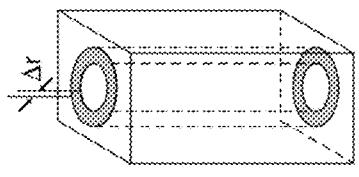
FIG. 6B
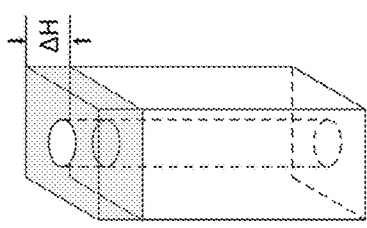
FIG. 6C
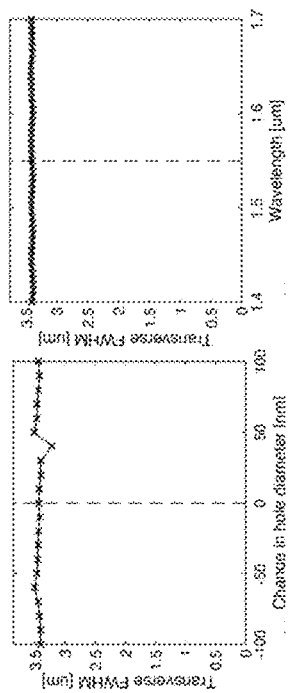
FIG. 6D
FIG. 6E
FIG. 6F
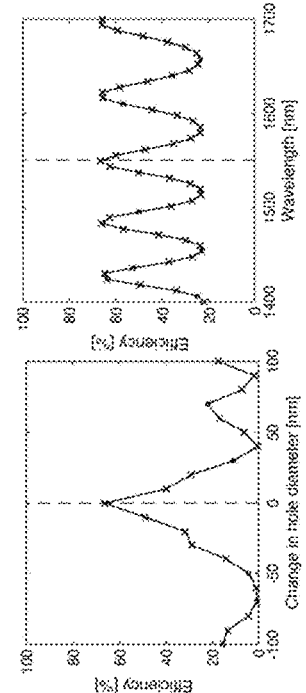
FIG. 6G
FIG. 6H
FIG. 6I

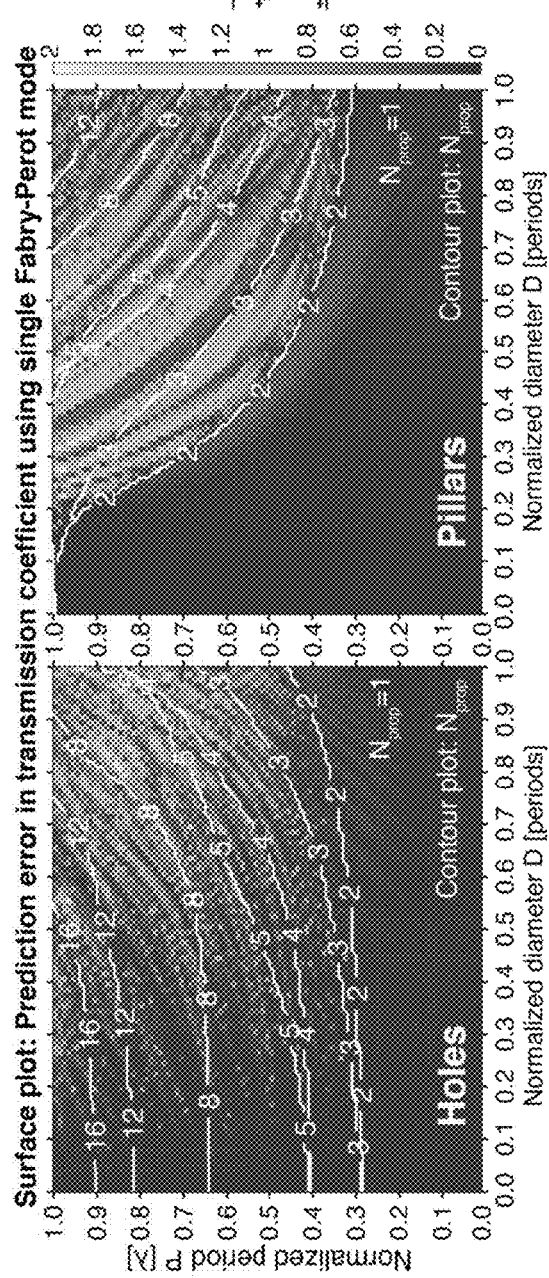
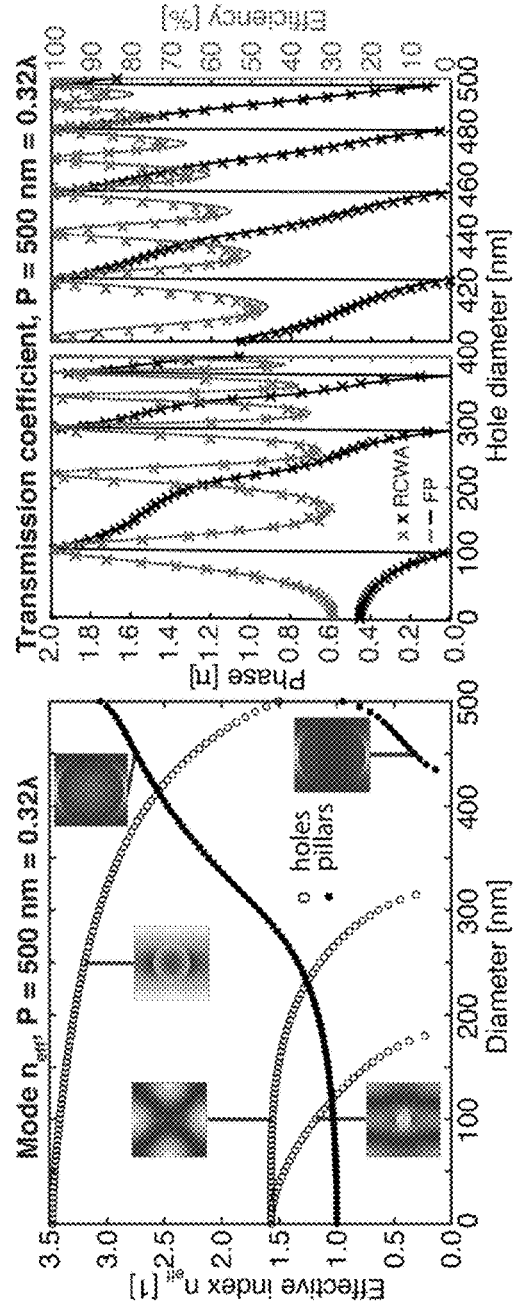

HIGH-ASPECT RATIO METALENS

CROSS-REFERENCE TO RELATED PATENT APPLICATIONS

This application claims the benefit and priority of U.S. Provisional Patent Application No. 63/106,825, filed on Oct. 28, 2020, the entirety of which is incorporated by reference herein.

GOVERNMENT LICENSE RIGHTS

This invention was made with Government support under 1541959 awarded by the National Science Foundation and HR00111810001 awarded by the Department of Defense/DARPA. The Government has certain rights in the invention.

BACKGROUND

Refractive imaging optics can be bulky and expensive, and can be restricted to single functions. In addition, each refractive device can require individual optical characterization for sensitive commercial applications. Metasurface-based optics exploiting nanostructured surfaces can offer diffraction-limited, lightweight, multifunctional, and reproducible optical behavior. However, fabrication and fragility constraints can limit the maximum device diameter and the aspect ratio of free-standing structures of metasurfaces.

SUMMARY

The systems and methods of the present disclosure relate to a metasurface platform which expands the range of accessible optical behavior in flat optics. This class of metasurfaces can include substrate-less layers of ultra-deep via-holes with aspect ratios exceeding 30:1 that focus incident light into diffraction-limited spots. Instead of shaping the metasurface optical phase profile alone, both transmitted phase and amplitude profiles can be sculpted simultaneously by engineering the effective index profile. By using effective index profiles that improve the impedance match between the incident and transmitted media, the theoretically achievable silicon holey metalens (sometimes referred to herein as holey metasurface, optical device or membrane) absolute efficiency (normalized to the incident intensity) can exceed the maximum theoretical efficiency of an uncoated bulk silicon lens by 5%. This holey metalens can pave the way for a generation of high-aspect ratio, substrate-less, and ruggedized flat optics. Optical device including a holey metalens can withstand harsh cleaning and handling while maintaining focusing performance.

At least one aspect of the present disclosure is directed to an optical device. The optical device includes a membrane. The membrane includes a plurality of apertures extending at least partially through a thickness of the membrane. The membrane is configured to structure incoming light having a wavelength to produce modified light. The wavelength of the incoming light in vacuum is in a range from ultraviolet light to mid-infrared light. The membrane is configured to reflect the modified light away from the membrane. A separation between each of the plurality of apertures is subwavelength relative to the wavelength of the incoming light. A width of each of the plurality of apertures is subwavelength relative to the wavelength of the incoming light. A length of each of the plurality of apertures is wavelength-scale relative to the wavelength of the incoming light.

Another aspect of the present disclosure is directed to an optical device. The optical device includes a membrane. The membrane includes a plurality of apertures extending at least partially through a thickness of the membrane. The membrane is configured to structure incoming light having a wavelength to produce modified light. The wavelength of the incoming light in vacuum is in a range from ultraviolet light to mid-infrared light. The membrane is configured to transmit the modified light through the membrane. A separation between each of the plurality of apertures is subwavelength relative to the wavelength of the incoming light. A width of each of the plurality of apertures is subwavelength relative to the wavelength of the incoming light. A length of each of the plurality of apertures is wavelength-scale relative to the wavelength of the incoming light.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 1A illustrates a cross-sectional view and a three-dimensional schematic of a holey metalens, according to an embodiment.

FIG. 1B illustrates a plot of a phase profile of an optimized structure, a hyperbolic phase profile, and a phase profile of an experimentally measured holey metalens, according to an embodiment.

FIG. 1C illustrates an effective index profile of a holey metalens for optimized and experimental structures, according to an embodiment.

FIG. 2A illustrates an optical micrograph of a fabricated device, according to an embodiment.

FIG. 2B illustrates a scanning electron micrograph of a holey metalens, according to an embodiment.

FIGS. 2C-2E illustrate a simulation of a design focal spot, an experimental focal spot, and a simulation of an expected focal spot, according to an embodiment.

FIGS. 3A-3D illustrate optical characterization measurements of a holey metalens array, according to an embodiment.

FIGS. 6A-6I illustrate robustness of the holey metalens design to fabrication and spectral imperfections, according to an embodiment.

FIGS. 16A-16B illustrate eigenmode properties for a periodic hole array and a periodic cylindrical pillar array, according to an embodiment.

FIG. 16C illustrates a plot of propagating Bloch eigenmode effective refractive indices as a function of pillar or hole diameter, according to an embodiment.

FIG. 16D illustrates complex transmission coefficient dependence on hole diameter, according to an embodiment.

Like reference numbers and designations in the various drawings indicate like elements.

DETAILED DESCRIPTION

Figure 4A:
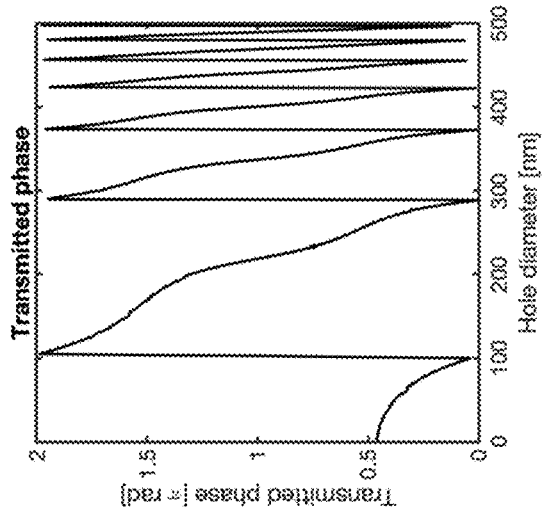
FIGS. 4A-4C illustrate transmitted optical properties for a holey metalens library, according to an embodiment.

Following below are more detailed descriptions of various concepts related to, and implementations of methods and apparatuses for optical devices including a membrane (e.g., substrate, film/layer/sheet of material, which can be flexible or pliable), the membrane including a plurality of apertures (e.g., holes, voids, depressions) extending at least partially through a thickness of the membrane. The various concepts introduced above and discussed in greater detail below may be implemented in any of a number of ways, as the described concepts are not limited to any particular manner of implementation. Examples of specific implementations and applications are provided primarily for illustrative purposes.

Metasurfaces can have multifunctionality and ability to match or exceed the performance of conventional refractive optics within a lightweight footprint. An all-glass metasurface fabricated using deep-ultraviolet (DUV) lithography can have lower monochromatic aberrations than an equivalent aspheric lens. A single metasurface can be used to turn an image sensor into a polarization camera. The uniformly flat, few-layered geometry of metasurfaces can simplify optical alignment. These surfaces can be designed with subwavelength nanostructures (e.g., meta-atoms, meta-elements) that allow the phase, amplitude, and polarization of incident light to be manipulated with precision. The shape of the nanostructures can produce optical responses that exceed the capabilities of the bulk material alone. The nanostructures can be fabricated using CMOS-compatible technologies and high throughput nanoimprinting methods which can enable these devices to be scaled up to high volumes reproducibly. A metasurface can include an array of subwavelength features that are subwavelength spaced. For example, one or more of the dimensions of the features can be subwavelength relative to the wavelength of the incoming light in vacuum. The one or more of the dimensions of the features can be less than the wavelength of the incoming light in vacuum. The spacing between the features (e.g., periodicity) can be subwavelength (e.g., less than the wavelength of the incoming light). The spacing between the features can be less than the wavelength of the incoming light to avoid Bragg diffraction.

Plasmonic metasurfaces can use nanoholes or slits in thin sheets of metal as meta-atoms. The application of these devices can be limited by absorptive losses in metallic layers and the lack of control over the full a phase delay for light. The latter limitation can arise from the small aspect ratio of the fabricated meta-atoms, which can be limited to 5:1 for plasmonic lenses. To address these shortcomings, high-refractive index dielectric nanopillars can be used as alternative meta-atoms at visible wavelengths. These dielectric materials can be transparent at the design wavelengths. They can achieve higher aspect ratio structures (approaching 20:1) compared to the plasmonic nanoholes, which can allow the fabricated metasurfaces to be highly efficient and achieve full control over the phase of light. The pillar-based metasurface platform can include lenses, polarimeters, vortex beam generators, Bessel-beam generators, and holograms.

A constraint facing meta-atoms can include the aspect ratio (e.g., the ratio of the out-of-plane height to the in-plane size for free-standing pillars). The characteristic in-plane size of meta-atoms may be smaller than the design wavelength. This can allow for the engineering of the optical wavefront with high spatial precision and for the suppression of higher diffraction orders. The meta-atoms may be tall to maximize the interaction between the incident light and the nanostructured material. Taller meta-atoms can expand the range of optical behaviors that can be modulated for a given range of meta-element shapes. For example, taller meta-atoms can expand the phase coverage or the range of optical phases that can be imprinted onto an incident wavefront. To obtain full phase coverage and arbitrary structuring of wavefront tilts, meta-atoms can be tall enough to address the entire a radian span. Taller meta-atoms can increase the range of group delays that can be achieved, which can be used for engineering the dispersion (e.g., chromatic dependence) of the device and producing achromatic behavior for large scale devices.

Practical fabrication considerations can limit the maximum aspect ratio used in metasurfaces with free-standing pillars. Tall, pillar-like structures can be fragile and easily fall or break during processing. The maximum aspect ratio used for free-standing titanium dioxide metasurfaces can be limited to 15:1. The maximum aspect ratio used for free-standing silicon is 20:1. The systems and methods of the present disclosure relate to a metasurface platform which overcomes the limitations of metasurfaces which include free-standing pillars.

FIG. 1A illustrates a cross-sectional view and a three-dimensional schematic of a holey metalens 100 (e.g., holey structure, holey metalens array, metalens array, metasurface, metasurface array, etc.). Monochromatic light with wavelength 1.55 μm can be incident on a 5 μm thick crystalline silicon membrane. The holey metalens 100 can include a membrane 102. The membrane 102 can include a plurality of nanoholes (e.g., apertures 104). For example, the membrane 102 can include at least 700,000 etched via-nanoholes (e.g., via-holes). The optical wavefront of the incident beam can be controlled by the holey structure and can produce a diffraction-limited focal spot upon transmission. The holey metalens 100 can include a thick silicon member 106 to improve ease of handling. The holey metalens 100 can include a metasurface platform that resolves the technological limitations associated with limited aspect ratios and that can allow for large diameter achromatic metalenses. These metalenses can include ultra-deep via-holes through the membrane 102 (e.g., thin membrane). The material around each hole (e.g., recess, cavity, tunnel, channel, void, aperture, etc.) can form a contiguous structure, continuous structure, or a monolithic structure. The holey metalens 100 can be robust and can be fabricated without a supporting substrate (e.g., glass substrate). This can expand the application range for this metasurface platform to cases where substrate cannot be used. An array of monochromatic metalenses can be fabricated in silicon and their optical performances in the near-infrared regime can be characterized. The membrane 102 can include (e.g., be made of) silicon dioxide, titanium dioxide, calcium fluoride, silicon nitride, silicon carbide, titanium nitride, glass, III-V and II-VI semiconductors, diamond, barium titanate, complex oxides, or perovskite oxides. The membrane 102 can be made of a single material as opposed to two or more different materials. The membrane 102 can be monolithic (e.g., formed from a single piece of material). The holey metalens 100 can include a structure without pillars. The holey metalens 100 can include a structure with only holes or apertures.

The radial phase profile OM of a focusing metalens can be described by a hyperbolic function:

$$\phi(r) = k_0 (f - \sqrt{r^2 + f^2}), \quad (1)$$

where $k_0 = 2\pi/\lambda$, is the vacuum wavenumber, f is the focal length, and r is the radial coordinate on the metalens plane, which ranges from 0 to D/2, half of the diameter. The hyperbolic phase profile can introduce an in-plane phase gradient so that normally-incident light is bent towards an on-axis focal point located at distance f away from the surface, producing a diffraction-limited spot.

To enforce this phase profile, the metalens surface can be partitioned into pixels of subwavelength in-plane size. The meta-element for each pixel can be selected based on its radial position r. These meta-atoms can be selected from a "library" (e.g., a collection) of meta-atoms, where the optical response (e.g., phase response, amplitude response, polarization response, etc.) of each meta-element has been simulated in advance through techniques such as finite-difference time-domain (FDTD) simulations or rigorous coupled-wave analysis (RCWA) simulations. The target phase distribution can be enforced by use of ultra-deep via-holes through a silicon membrane.

The holey metalens 100 can be part of an optical device for reflection. The optical device can include a monolithic metasurface or holey metalens 100. The optical device can operate in an infrared spectral range. The optical device can withstand harsh cleaning and handling while maintaining focusing performance. The optical device can include the membrane 102. The membrane 102 can include a plurality of apertures 104 extending at least partially through a thickness of the membrane 102. The membrane 102 can be configured to structure (e.g., modify, change) incoming light 120 to produce modified light (e.g., reflected modified light 122). The incoming light 120 can have a wavelength (e.g., wavelength of the incoming light). The incoming light 120 can have one or more wavelengths. The wavelength of the incoming light 120 in vacuum (e.g., vacuum wavelength, vacuum wavelength of the incoming light) can be in a range from ultraviolet light to mid-infrared light. Ultraviolet (UV) light can be in a range of 100 nm to 400 nm (e.g., 100 nm, 150 nm, 200 nm, 250 nm, 300 nm, 350 nm, or 400 nm, inclusive). Mid-infrared light can be in a range of 3 μm to 10 μm (e.g., 3 μm, 5 μm, 8 μm, or 10 μm, inclusive). The wavelength of the incoming light 120 in vacuum can be in a range of 100 nm to 10,000 nm (e.g., 100 nm, 500 nm, 1,000 nm, 2,000 nm, 5,000 nm, 7,500 nm, or 10,000 nm, inclusive). The wavelength of the incoming light 120 in vacuum can be UV light, visible light, or infrared light. Structuring the incoming light 120 can including modifying the phase profile, amplitude profile, or polarization profile of the incoming light 120. For example, the modified light can have a different phase profile, amplitude profile, or polarization profile than that of the incoming light 120. The membrane 102 can be configured to reflect the modified light away from the membrane 102. Each of the plurality of apertures 104 can have a width 150 (e.g., diameter) and a length 152 (e.g., depth, height, etc.). Each of the plurality of apertures 104 can have a length to width aspect ratio of at least 10:1. At least 10% (e.g., 10%, 20%, 30%, 40%, 50%, 60%, 70%, 80%, 90%, or 100%) of the plurality of apertures 104 can have a length to width aspect ratio of at least 25:1 (e.g., 25:1, 50:1, 75:1, 100:1, 150:1, 200:1, etc.).

In some embodiments, the plurality of apertures 104 can include via-holes or through-holes. The membrane 102 can include a first surface 130 and a second surface 140. The plurality of apertures 104 can each have an opening 132 (e.g., nano-opening, nanohole, etc.) in a plane defined by the first surface 130 and can each have another opening 142 (e.g., nano-opening, nanohole, second opening, etc.) in a plane defined by the second surface 140. For example, the plurality of apertures 104 can go through the first surface 130 and through the second surface 140. The diameter (e.g., width 150, etc.) of the openings (e.g., opening 132, opening 142) can control the reflected phase of light. The openings can have radial symmetry or non-radial symmetry. The plurality of apertures 104 can be disjoint. For example, each of the plurality of apertures can be completely separated from each other. The plurality of apertures 104 can be formed via etching or through an etching process. The membrane 102 can be formed through an etching process as opposed to an additive manufacturing process to create the membrane 102. The plurality of apertures 104 can be located within the membrane 102 as opposed to holes being located within pillars.

A separation 154 (e.g., separation distance, such as aperture edge to aperture edge separation distance, or aperture center to aperture center separation distance) between each of the plurality of apertures 104 can be subwavelength relative to the wavelength of the incoming light 120. For example, the separation 154 between each of the plurality of apertures 104 can be less than the wavelength of the incoming light 120 in vacuum. The separation 154 between each of the plurality of apertures 104 can be 0.5 μm and the wavelength of the incoming light 120 in vacuum can be 1 μm. The separation 154 between each of the plurality of apertures 104 can be substantially subwavelength. Subwavelength can include can include a multiple (e.g., 0.1 times, 0.2 times, 0.3 times, 0.4 times, 0.5 times, 0.6 times, 0.7 times, 0.8 times, 0.9 times, etc.) of the wavelength of the incoming light 120 that is less than the wavelength of the incoming light 120.

In some embodiments, the plurality of apertures 104 can include blind holes. The membrane 102 can include the first surface 130 and the second surface 140. The plurality of apertures 104 can each have an opening 132 in a plane defined by the first surface 130 and lacks an opening 142 along a plane defined by the second surface 140. For example, the plurality of apertures 104 can go through the first surface 130 but not through the second surface 140.

In some embodiments, the membrane 102 is configured to operate in reflection as at least one of a converging reflector, a diverging reflector, a cylindrical reflector, a corrector of optical aberrations of a second optical element, a diffraction grating, or a waveplate. For example, the membrane 102 can operate in reflection by reflecting incoming light 120 towards the source of the incoming light 120 and away from the membrane 102. The membrane 102 can be configured to operate in reflection as a corrector of optical aberrations of a second optical element. The membrane 102 can be configured to operate in reflection as a diffraction grating. The membrane 102 can be configured to operate in reflection as a waveplate (e.g., retarder). For example, the membrane 102 can operate as a waveplate by altering the polarization of the incoming light 120. The membrane 102 can also operate as a spatially-varying waveplate by altering the polarization of incoming light 120 in a spatially-varying manner.

In some embodiments, one or more optical properties is constant at a plurality of incident wavelengths. The one or more optical properties of the membrane 102 can be constant at a plurality of incident wavelengths. The one or more optical properties of the optical device can be constant at a plurality of incident wavelengths. A phase profile of the reflected modified light 122 can produce focusing of incident light at a plurality of wavelengths with a same focal length. For example, the optical device can exhibit achromatic behavior. The phase profile of the reflected modified light 122 can produce diffracted orders with a same diffraction angle at a plurality of wavelengths. For example, the optical device can exhibit achromatic grating behavior.

In some embodiments, each of the plurality of apertures 104 has width 150 and length 152. At least 10% (e.g., 10%, 20%, 30%, 40%, 50%, 60%, 70%, 80%, 90%, or 100%) of the plurality of apertures 104 can have a length to width aspect ratio of at least 100:1. For example, the optical device can include high-aspect ratio or ultra-high aspect ratio holes (e.g., 100:1, 150:1, 200:1, 300:1, etc.). In some embodiments, the length 152 of each of the plurality of apertures 104 is slanted (e.g., tilted, angled, non-perpendicular) relative to a plane surface of the membrane 102. The plane surface of the membrane 102 can include a substantially flat surface of the membrane 102. The plane surface of the membrane 102 can include a top surface of the membrane 102 defined by a plane. The plane surface of the membrane 102 can include a bottom surface of the membrane 102 defined by a plane. The plane surface of the membrane 102 can include an outer surface of the membrane 102 defined by a plane. For example, the length axis of the plurality of apertures can intersect the plane surface of the membrane 102 at an angle (e.g., 40°, 50°, 60°, 70°, 80°, 90°, 100°, 110°, 120°, 130°, 140°, etc.). In some embodiments, the optical device includes a filler material disposed in the plurality of apertures 104. The filler material can include a polymer or electro-optical material. The filler material can completely or partially fill the plurality of apertures 104, and may extend below the second surface 140 or above the first surface 130.

The width 150 of each of the plurality of apertures 104 can be subwavelength relative to the wavelength of the incoming light 120. For example, the width 150 of the plurality of apertures 104 can be less than the wavelength of the incoming light 120 in vacuum. The width 150 of the plurality of apertures 104 can be 100 nm and the wavelength of the incoming light 120 in vacuum can be 1 µm. The length 152 of each of the plurality of apertures 104 can be wavelength-scale relative to the wavelength of the incoming light 120. For example, the length 152 of the plurality of apertures 104 can be greater than the wavelength of the incoming light 120 in vacuum. The width 150 of the plurality of apertures 104 can be 5 µm and the wavelength of the incoming light 120 in vacuum can be 1 µm. Wavelength-scale can include a multiple (e.g., 1.5 times, 2 times, 5 times, 10 times, etc.) of the wavelength of the incoming light 120 that is greater than the wavelength of the incoming light 120. For example, the length 152 of each of the plurality of apertures 104 can be a multiple of the wavelength of the incoming light 120.

In some embodiments, the modified light (e.g., reflected modified light 122) includes light with at least one of a modified optical phase profile, modified amplitude profile, or modified polarization profile. The incoming light can have a first optical phase profile and the modified light can have a second optical phase profile. The first optical phase profile can be different from the second optical phase profile. The incoming light can have a first amplitude profile and the modified light can have a second amplitude profile. The first amplitude profile can be different from the second amplitude profile. The incoming light can have a first polarization profile and the modified light can have a second polarization profile. The polarization profile can include the geometric orientation of light waves. The first polarization profile can be different from the second polarization profile. The incoming light can have a first wavelength and the modified light can have a second wavelength. The first wavelength can be different from the second wavelength. The incoming light can exert an optical force upon transmission or reflection.

In some embodiments, each of the plurality of apertures 104 can have non-cylindrical symmetry. For example, the plurality of apertures 104 can include rectangular prism structures. A cross-sectional profile of a first aperture of the plurality of apertures 104 can vary over the length 152 of the first aperture. For example, each of the plurality of apertures 104 can have a variable width 150 along its length 152.

In some embodiments, the membrane 102 is mounted onto at least one of a flat solid substrate or a curved solid substrate to provide structural support. For example, the holey metalens 100 can be mounted on a glass wafer. The membrane 102 can include a silicon device layer from a silicon-on-insulator (SOI) wafer. The silicon device layer can include a layer made of silicon that is part of a device. The membrane 102 can be immersed in a liquid medium and configured to operate in the liquid medium. The membrane 102 can be immersed in a liquid crystal medium and configured to operate in the liquid crystal medium. For example, a contact lens can include the holey metalens 100. The membrane 102 can have a non-zero in-plane curvature. For example, a coma-corrected device can include the membrane 102 with the non-zero in-plane curvature. In-plane curvature can include the curvature of the membrane surface. The contact lens can include the membrane 102 with the non-zero in-plane curvature. The optical device can include a plurality of optical functions for a plurality of light angles of incidence. For example, the plurality of optical functions can include a coma-corrected lens. The membrane 102 can include the plurality of optical functions for a plurality of light angles of incidence.

In some embodiments, the membrane 102 is configured to be folded one or more times for storage and unfolded for operation. In some embodiments, the membrane 102 is configured to be rolled-up for storage and unrolled for operation. In some embodiments, the membrane 102 is a first membrane and the optical device includes a second membrane cascaded in series with (e.g., adjacent to, juxtaposed, next to, etc.) the first membrane for multi-surface applications. The second membrane cascaded in series with the first membrane can include a bilayer including a first membrane and a second membrane. The bilayer can include the second membrane adjacent to the first membrane. The bilayer can include the second membrane on top of the first membrane or a first membrane on top of the second membrane. In some embodiments, the membrane 102 is sandwiched between two reflective or partially-reflective layers to produce an optical cavity. This arrangement can increase the Q-factor of resonance. The membrane 102 can include the first surface 130 and the second surface 140. The first surface 130 can be coated with at least one of a solid (e.g., thin solid such as 20 to 100 microns thick), a liquid, or a polymeric film. For example, the first surface 130 can be coated with an anti-reflection coating, high reflection coating, or bio-compatible coating. The first surface 130 can be coated with a coating to provide structural support or protection.

In some embodiments, the plurality of apertures 104 is a first plurality of apertures. The membrane 102 can include a second plurality of apertures extending at least partially through the thickness of the membrane 102. The membrane 102 can include the first surface 130 and the second surface 140. The first plurality of apertures can each have an opening 132 in a plane defined by the first surface 130 and can lack an opening 142 along a plane defined by the second surface 140. The second plurality of apertures can each have an opening 132 in the plane defined by the second surface 140 and can lack an opening 142 along the plane defined by the first surface 130.

The holey metalens 100 can be part of an optical device for transmission. The optical device can include a monolithic metasurface or holey metalens 100. The optical device can operate in an infrared spectral range. The optical device can include withstand harsh cleaning and handling while maintaining focusing performance. The optical device can include the membrane 102. The membrane 102 can include the plurality of apertures 104 extending at least partially through the thickness of the membrane 102. The membrane 102 can be configured to structure (e.g., modify, change) incoming light 120 to produce modified light (e.g., transmitted modified light 124). The incoming light 120 can have a wavelength (e.g., wavelength of the incoming light). The incoming light 120 can have one or more wavelengths. The wavelength of the incoming light 120 in vacuum (e.g., vacuum wavelength, vacuum wavelength of the incoming light) can be in a range from ultraviolet light to mid-infrared light. Ultraviolet (UV) light can be in a range of 100 nm to 400 nm (e.g., 100 nm, 150 nm, 200 nm, 250 nm, 300 nm, 350 nm, or 400 nm, inclusive). Mid-infrared light can be in a range of 3 µm to 10 µm (e.g., 3 µm, 5 µm, 8 µm, or 10 µm, inclusive). The wavelength of the incoming light 120 in vacuum can be in a range of 100 nm to 10,000 nm (e.g., 100 nm, 500 nm, 1,000 nm, 2,000 nm, 5,000 nm, 7,500 nm, or 10,000 nm, inclusive). The wavelength of the incoming light 120 in vacuum can be UV light, visible light, or infrared light. Structuring the incoming light 120 can including modifying the phase profile, amplitude profile, or polarization profile of the incoming light 120. For example, the modified light can have a different phase profile, amplitude profile, or polarization profile than that of the incoming light 120. The membrane 102 can be configured to transmit the modified light through the membrane 102. Each of the plurality of apertures 104 can have width 150 and length 152. Each of the plurality of apertures 104 can have a length to width aspect ratio of at least 10:1. At least 10% (e.g., 10%, 20%, 30%, 40%, 50%, 60%, 70%, 80%, 90%, or 100%) of the plurality of apertures 104 can have a length to width aspect ratio of at least 25:1 (e.g., 25:1, 50:1, 75:1, 100:1, 150:1, 200:1, etc.).

In some embodiments, the plurality of apertures 104 can include via-holes or through-holes. The membrane 102 can include the first surface 130 and the second surface 140. The plurality of apertures 104 can each have the opening 132 (e.g., nano-opening, nanohole, etc.) in the plane defined by the first surface 130 and can each have another opening 142 (e.g., nano-opening, nanohole, etc.) in the plane defined by the second surface 140. For example, the plurality of apertures 104 can go through the first surface 130 and through the second surface 140. The diameter (e.g., width 150, etc.) of the openings (e.g., opening 132, opening 142) can control the transmitted phase of light. The openings can have radial symmetry or non-radial symmetry. The plurality of apertures 104 can be disjoint. For example, each of the plurality of apertures can be completely separated from each other. The plurality of apertures 104 can be formed via etching or through an etching process. The membrane 102 can be formed through an etching process as opposed to an additive manufacturing process to create the membrane 102. The plurality of apertures 104 can be located within the membrane 102 as opposed to holes being located within pillars.

The separation 154 (e.g., separation distance) between each of the plurality of apertures 104 can be subwavelength relative to the wavelength of the incoming light 120. For example, the separation 154 between each of the plurality of apertures 104 can be less than the wavelength of the incoming light 120 in vacuum. The separation 154 between each of the plurality of apertures 104 can be 0.5 µm and the wavelength of the incoming light 120 in vacuum can be 1 µm. The separation 154 between each of the plurality of apertures 104 can be substantially subwavelength. Subwavelength can include can include a multiple (e.g., 0.1 times, 0.2 times, 0.3 times, 0.4 times, 0.5 times, 0.6 times, 0.7 times, 0.8 times, 0.9 times, etc.) of the wavelength of the incoming light 120 that is less than the wavelength of the incoming light 120.

In some embodiments, the plurality of apertures 104 can include blind holes. The membrane 102 can include the first surface 130 and the second surface 140. The plurality of apertures 104 can each have an opening 132 in a plane defined by the first surface 130 and lacks an opening 142 (e.g., is closed at one end) along a plane defined by the second surface 140. For example, the plurality of apertures 104 can go through the first surface 130 but not through the second surface 140.

In some embodiments, the membrane 102 is configured to operate in transmission as at least one of a converging lens, a diverging lens, a cylindrical lens, a corrector of optical aberrations of a second optical element, a diffraction grating, or a waveplate. For example, the membrane 102 can operate in transmission by transmitting incoming light 120 away from the source of the incoming light 120 and away from the membrane 102. The membrane 102 can be configured to operate in transmission as a corrector of optical aberrations (e.g., irregularity, defects) of (e.g., due to, caused/introduced by) a second optical element. The membrane 102 can be configured to operate in transmission as a diffraction grating. The membrane 102 can be configured to operate in transmission as a waveplate (e.g., retarder). For example, the membrane 102 can operate as a waveplate by altering the polarization of the incoming light 120. Membrane 102 can also operate as a spatially-varying waveplate by altering the polarization of incoming light 120 in a spatially-varying manner.

In some embodiments, one or more optical properties is constant at a plurality of incident wavelengths. The one or more optical properties of the membrane 102 can be constant at a plurality of incident wavelengths. The one or more optical properties of the optical device can be constant at a plurality of incident wavelengths. A phase profile of the transmission modified light 124 can produce focusing of incident light at a plurality of wavelengths with a same focal length. For example, the optical device can exhibit achromatic behavior. The phase profile of the transmission modified light 124 can produce diffracted orders with a same diffraction angle at a plurality of wavelengths. For example, the optical device can exhibit achromatic grating behavior.

In some embodiments, each of the plurality of apertures 104 has width 150 and length 152. At least 10% (e.g., 10%, 20%, 30%, 40%, 50%, 60%, 70%, 80%, 90%, or 100%) of the plurality of apertures 104 can have a length to width aspect ratio of at least 100:1. For example, the optical device can include ultra-high aspect ratio holes (e.g., 100:1, 150:1, 200:1, 300:1, etc.). In some embodiments, the length 152 of each of the plurality of apertures 104 is slanted (e.g., tilted, angled, non-perpendicular) relative to a plane surface of the membrane 102. The plane surface of the membrane 102 can include a substantially flat surface of the membrane 102. The plane surface of the membrane 102 can include a top surface of the membrane 102 defined by a plane. The plane surface of the membrane 102 can include a bottom surface of the membrane 102 defined by a plane. The plane surface of the membrane 102 can include an outer surface of the membrane 102 defined by a plane. For example, the length axis of the plurality of apertures can intersect the plane surface of the membrane 102 at an angle (e.g., 40°, 50°, 60°, 70°, 80°, 90°, 100°, 110°, 120°, 130°, 140°, etc.). In some embodiments, the optical device includes a filler material disposed in the plurality of apertures 104. The filler material can include a polymer or electro-optical material. The filler material can completely or partially fill the plurality of apertures 104, and may extend below the second surface 140 or above the first surface 130.

The width 150 of each of the plurality of apertures 104 can be subwavelength relative to the wavelength of the incoming light 120. For example, the width 150 of the plurality of apertures 104 can be less than the wavelength of the incoming light 120 in vacuum. The width 150 of the plurality of apertures 104 can be 100 nm and the wavelength of the incoming light 120 in vacuum can be 1 μm. The length 152 of each of the plurality of apertures 104 can be wavelength-scale relative to the wavelength of the incoming light 120. For example, the length 152 of the plurality of apertures 104 can be greater than the wavelength of the incoming light 120 in vacuum. The width 150 of the plurality of apertures 104 can be 5 μm and the wavelength of the incoming light 120 in vacuum can be 1 μm. Wavelength-scale can include a multiple (e.g., 1.5 times, 2 times, 5 times, 10 times, etc.) of the wavelength of the incoming light 120 that is greater than the wavelength of the incoming light 120. For example, the length 152 of each of the plurality of apertures 104 can be a multiple of the wavelength of the incoming light 120.

In some embodiments, the modified light (e.g., transmitted modified light 124) includes light with at least one of a modified optical phase profile, modified amplitude profile, or modified polarization profile. The incoming light can have a first optical phase profile and the modified light can have a second optical phase profile. The first optical phase profile can be different from the second optical phase profile. The incoming light can have a first amplitude profile and the modified light can have a second amplitude profile. The first amplitude profile can be different from the second amplitude profile. The incoming light can have a first polarization profile and the modified light can have a second polarization profile. The first polarization profile can be different from the second polarization profile. The incoming light can have a first wavelength and the modified light can have a second wavelength. The first wavelength can be different from the second wavelength.

In some embodiments, each of the plurality of apertures 104 can have non-cylindrical symmetry. For example, the plurality of apertures 104 can include rectangular prism structures. A cross-sectional profile of a first aperture of the plurality of apertures 104 can vary over the length 152 of the first aperture. For example, each of the plurality of apertures 104 can have a variable width 150 along its length 152.

In some embodiments, the membrane 102 is mounted onto at least one of a flat solid substrate or a curved solid substrate to provide structural support. For example, the holey metalens 100 can be mounted on a glass wafer. The membrane 102 can include a silicon device layer from a silicon-on-insulator (SOI) wafer. The silicon device layer can include a layer made of silicon that is part of a device. The membrane 102 can be immersed in a liquid medium and configured to operate in the liquid medium. For example, a contact lens can include the holey metalens 100. The membrane 102 can have a non-zero in-plane curvature. The curvature of the membrane 102 can include a non-zero amount by which the surface of the membrane 102 deviates from a plane. For example, a coma-corrected device can include the membrane 102 with the non-zero in-plane curvature. In-plane curvature can include the curvature of the membrane surface. The contact lens can include the membrane 102 with the non-zero in-plane curvature. The optical device can include a plurality of optical functions for a plurality of light angles of incidence. For example, the plurality of optical functions can include a coma-corrected lens. The membrane 102 can include the plurality of optical functions for a plurality of light angles of incidence.

In some embodiments, the membrane 102 is configured to be folded one or more times for storage and unfolded for operation. In some embodiments, the membrane 102 is configured to be rolled-up for storage and unrolled for operation. In some embodiments, the membrane 102 is a first membrane and the optical device includes a second membrane cascaded in series with (e.g., adjacent to, juxtaposed, next to, etc.) the first membrane for multi-surface applications. The second membrane cascaded in series with the first membrane can include a bilayer including a first membrane and a second membrane. The bilayer can include the second membrane adjacent to the first membrane. The bilayer can include the second membrane on top of the first membrane or a first membrane on top of the second membrane. In some embodiments, the membrane 102 is sandwiched between two reflective or partially-reflective layers to produce an optical cavity. This arrangement can increase the Q-factor of resonance. The membrane 102 can include the first surface 130 and the second surface 140. The first surface 130 can be coated with at least one of a solid (e.g., thin solid such as 20 to 100 microns thick), a liquid, or a polymeric film. For example, the first surface 130 can be coated with an anti-reflection coating, high reflection coating, or bio-compatible coating. The first surface 130 can be coated with a coating to provide structural support or protection.

In some embodiments, the plurality of apertures 104 is a first plurality of apertures. The membrane 102 can include a second plurality of apertures extending at least partially through the thickness of the membrane 102. The membrane 102 can include the first surface 130 and the second surface 140. The first plurality of apertures can each have an opening 132 in a plane defined by the first surface 130 and can lack an opening 142 along a plane defined by the second surface 140. The second plurality of apertures can each have an opening 132 in the plane defined by the second surface 140 and can lack an opening 142 along the plane defined by the first surface 130.

FIG. 1B illustrates a plot of a phase profile of an optimized structure 110, a hyperbolic phase profile, and a phase profile of an experimentally measured holey metalens 112. If only the phase profile of meta-atoms is optimized, the converged phase profile can include the hyperbolic phase profile. When the effective index is used as the optimization parameter to maximize the light intensity at the focal point, the optimized phase profile can deviate from the hyperbolic phase profile and the optimal objective value obtained can be superior to that of phase-only optimization. The optimized phase profiles for the case of transmission through a perforated H=5 μm silicon slab at λ=1.55 μm are plotted in FIG. 1B and the optimized effective index profile is plotted in FIG. 1C. FIG. 1C illustrates an effective index profile of the holey metalens 100 for optimized and experimental structures. The optimized profile can skip elements that have low transmission efficiencies in favor of elements with higher transmission efficiencies, for example, skipping phase values around $$\frac{\pi}{2} \text{ or } \frac{3\pi}{2}.$$

For the case of an H=5 μm-thick air hole array in silicon at λ=1.55 μm, a metalens (f=1 mm, D=480 μm) with a phase profile optimized using the effective index method can exhibit a transmission fraction (e.g., transmitted power normalized to the incident power) of 73.9%. This transmission fraction can be approximately 5% higher than the transmitted power percentage through an air/silicon interface at normal incidence, which can be 69.4%, as calculated using the Fresnel power transmission coefficients $$\frac{4(n_{Si}/n_{air})}{(n_{Si}/n_{air} + 1)^2}.$$

The latter value can arise due to the large refractive index contrast between air and silicon at 1.55 μm of 1:3.48, which can produce reflective losses at the air/silicon interface. Since the inverse-designed metalens transmission can exceed the maximum normal transmission of a thick silicon slab, metalens performance can exceed a silicon lens with a hyperbolic phase profile.

For a device efficiency defined in terms of the power flux encircled by a 20 μm diameter aperture around the focal spot on the focal plane (e.g., around 2.4 times the Airy disk diameter of 8.2 μm), normalized to the incident power, the efficiency of the effective index-optimized structure can be 68.9% and that of an ideal hyperbolic bulk silicon lens (e.g., including the effect of Fresnel reflection) can be 64.5%. This enhanced transmission effect can arise due to the Fabry-Perot resonances that occur within the holey silicon membrane. Around these resonances, the transmission coefficient of the nanoholes can be close to unity and larger than the Fresnel coefficient for transmission at normal incidence. This optimization process can exploit these high transmission effective indices in the design to achieve higher transmission performance.

The large aspect ratios afforded by the hole-like nanostructures can expand the range of group delays $$\frac{\partial \phi(r, \omega)}{\partial \omega}$$

(e.g., phase dispersion) that can be achieved by such features as a result of the thicker optical path length through the meta-atoms. This can be relevant for the development of large-area achromatic metalenses, since such devices may require a spatially variant group delay in addition to the spatially variant optical phase that produces focusing. The maximum diameter of an achromatic metalens can be proportional to the maximum range of group delays for the same lens numerical aperture. The use of ultra-deep hole-like meta-atoms may open the path towards achieving centimeter-scale achromatic metasurfaces. The achromatic metalens can include meta-atoms with a variety of shapes (e.g., cylinder, rectangular prism, etc.). The optical phase and group delay can be controlled for each meta-element. The cylindrical hole library can have a group delay that is nonlinearly correlated with the transmitted phase and that achieves a range of group delays from to −13.0 fs to 64.6 fs (77.6 fs range) when evaluated on the wavelength domain λ=1.4 μm to 1.7 μm. This can enable the fabrication of an achromatic metalens that is 400 μm in diameter for NA=0.23, provided the library can be expanded to allow independent control of the transmitted phase and group delay.

The metalens elements (or meta-elements) can be characterized using the transmission phase and/or their local effective indices. Several hole-like meta-atoms can exhibit low transmitted amplitudes at smaller hole sizes. These hole-like meta-atoms may be used for applications which require the maximum possible transmission efficiency or a uniform transmission amplitude for each meta-element selected. Using low-efficiency meta-atoms may reduce the overall device efficiency. The hole-like meta-atoms can allow for the tuning of the local effective index in a point-by-point fashion. The metalens design problem can be reframed in the language of effective indices instead of phase profiles alone. An optimized effective index profile can be identified using the meta-atoms in the effective index roles. The resulting designs can achieve superior performance in numerical simulations compared to devices designed using a phase-only approach. In addition to hole-like meta-atoms, pillar-like meta-atoms can also be characterized by their effective indices, and thus can be used in applications in which a spatially varying effective index is desired. Devices which rely on spatial gradients in the effective index can be designed. This can allow for both transmission phase and amplitude degrees of freedom to be considered simultaneously.

FIG. 2A illustrates an optical micrograph of a fabricated device. The 5 μm deep via-holes can be spaced 0.5 μm apart in center-to-center distance and their designed aspect ratio (e.g., depth to diameter, length to width, etc.) can be 50:1. The spacing between the holes can vary. Due to overetching in the fabrication process, the highest achieved experimental aspect ratio in a device can be 30:1. The highest achieved experimental aspect ratio in dose tests can be 50:1. Darker regions can represent larger holes. The effective index and phase profiles achieved by a representative lens based on the hole sizes obtained experimentally are plotted in FIGS. 1B and 1C, respectively. There can be a visual mismatch between the design and experimental curves because the experimental sample can be fabricated based on an early effective index profile that was locally optimal but not globally optimal. Each lens can be designed to focus incident light at $\lambda=1550$ nm.

FIG. 2B illustrates a scanning electron micrograph of the holey metalens 100 (e.g., membrane with apertures). The scanning electron micrograph can include a tilted SEM micrograph of the fabricated device as seen from indented (e.g., thinned) side. The holey metalens 100 can include a 1.3 mm depression. Focused ion beam (FIB) milling can be used to capture cross-sections of the silicon membrane (e.g., membrane 102). FIB milling can be used to verify the thickness of the membrane 102. The small opening made by the FIB can be visible at the center of FIG. 2B.

FIGS. 2C-2E illustrate a simulation of a design focal spot, an experimental focal spot, and a simulation of an expected focal spot. FIG. 2C illustrates a simulation of the focal spot produced by the optimized design holey metalens upon illumination with a plane wave. The efficiency can be defined as the power flux through a 20 μm diameter aperture at the focal plane divided by the incident power. FIG. 2D illustrates experimental measurement of a holey metalens focal spot upon illumination with a plane wave. Highly symmetric focal spot profiles can be obtained at the designed wavelength. The focal spot profile can coincide with that of the optimized design, which is plotted in FIG. 2C. FIG. 2E illustrates a simulation of the expected focal spot profile based on SEM measurements of the experimental hole diameters attained. The simulated focusing profiles based on experimental geometries can be similar to that obtained in experiments. This can validate the simulation pipeline from nanohole geometry to optical transmission characteristics and focusing behavior. There may be no difference between the expected focal spot profile in the optimized case and in the simulation based on actual lens nanohole diameters. The focusing efficiency in the latter case can be lower as a result of the lens being overetched which can produce larger nanoholes than designed.

FIGS. 3A-3D illustrate optical characterization measurements of a holey metalens array. An array of ten identical holey metalenses can be fabricated on undoped crystalline silicon. The numbering and spatial positions of the lenses are displayed in the inset of FIG. 3A. The diameter of each holey metalens is 480 μm and the focal length is 1 mm, giving a numerical aperture (NA) of 0.23. The quality of the measured focal spots can be evaluated by measuring their transverse full-width-at-half-maximum (FWHM) intensity and calculating their Strehl ratios. The Strehl ratio can include the ratio of maximum value of the measured focusing intensity profile to the ideal Airy disk maximum calculated for the same system aperture. The Strehl ratio can take values between 0 and 1. According to Maréchal's criterion, a lens can be considered diffraction limited when the Strehl ratio is above 0.8. FIG. 3A exhibits the FWHM obtained for the holey metalens focal spots compared to the diffraction-limited value. FIG. 3B shows the Strehl ratio for each lens in the array. The fabricated devices can exhibit diffraction limited behavior with Strehl ratios exceeding 0.8.

Although the inverse-designed metalens may not have a strictly hyperbolic phase profile, the designed focal spot intensity profile can be equivalent to that of a diffraction-limited spot from a hyperbolic phase profile. The designed imaging quality can be equivalent to that of a diffraction-limited system. The designed imaging quality can track the diffraction-limit through-focus modulation transfer function (MTF) at normal incidence, as shown in FIG. 3C. The MTF can be obtained by Fourier transformation of the theoretical and experimental point spread functions. When the observed experimental geometry using SEM-measured nanohole sizes is simulated, the through-focus MTF can be located close to the diffraction-limit line. FIG. 3C illustrates the measured efficiencies for each lens in the array. The efficiency can be defined as the ratio of the transmitted intensity in the focal spot to the incident intensity. FIG. 3D illustrates the modulation transfer function of the experimental device as compared to simulated results and diffraction limited performance.

The holey metalens efficiencies can be measured by comparing the transmitted power within the focal spot to the incident power. A 20 μm diameter aperture (e.g., around 2.4 times the Airy disk diameter of 8.2 μm) can be placed in the focal plane to block out light around the focal spot. The focal spot and incident laser power values is measured directly using a laser power meter. The efficiencies for each holey metalens device are plotted in FIGS. 3A-3D. The efficiencies obtained can be less than an ideal design value of 68.9%. This can be attributed to over-etching of the nanoholes, which can result in the nanoholes being wider than designed. Numerical simulations based on the measured nanohole diameters for lens 6 predict an efficiency of 21.6%. This is close to the experimentally measured efficiency for lens 6 of 17.6%.

Figure 4B:
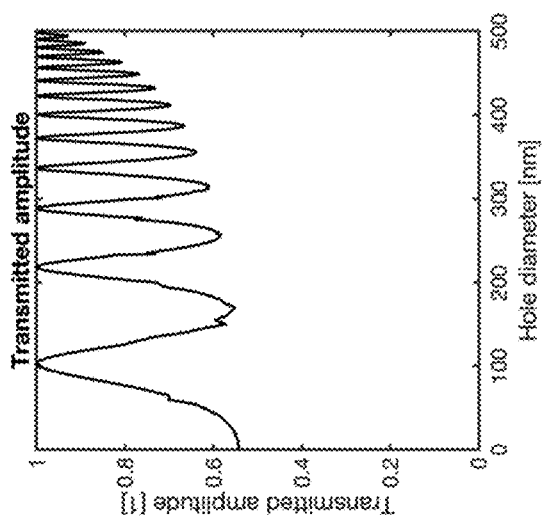
Figure 4C:
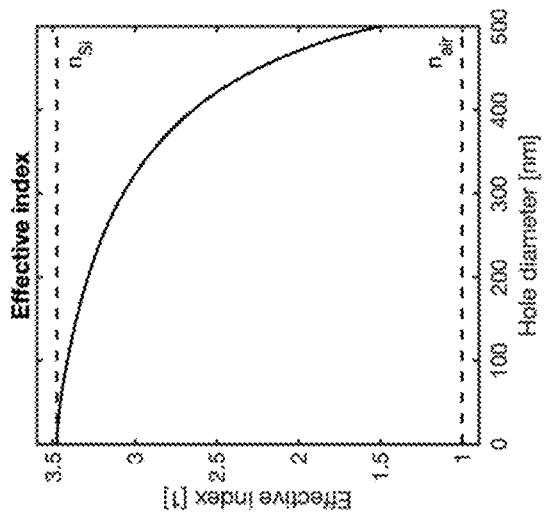

FIGS. 4A-4C illustrate transmitted optical properties for a holey metalens library. The holey metalens library can include $H=5$ μm deep holes in silicon at $\lambda=1550$ nm, with periodicity $P=500$ nm. The acquired phase of each meta-element pixel can be controlled by the diameter of the circular air hole with $2\pi$ phase coverage as shown in FIG. 4A. FIG. 4A shows the transmitted phase as a function of hole diameter. The phase can be defined relative to that of the incident plane wave just before the lens. The transmission amplitude can be strongly dependent on the meta-element geometry and correlated with the acquired phase, reaching 100% transmission for certain diameters and achieving 0 or $\pi$ phase shift at these values. The holey meta-atoms can operate in the effective medium regime and can be described to a degree of approximation by the behavior of a single dominant Bloch eigenmode with a single effective refractive index $n_{eff}(D)$ that depends on the hole diameter D and slab thickness H as shown in FIG. 4C. The unity transmission behavior can arise due to Fabry-Perot resonances $n_{eff}k_0H=m\pi$, $m\in 1,2,3, \ldots$, of that dominant Bloch eigenmode within the slab. FIG. 4B illustrates the transmitted amplitude as a function of hole diameter. FIG. 4C illustrates the effective index of the dominant Bloch mode as a function of hole diameter. The refractive indices of silicon and air at $\lambda=1550$ nm are also shown in dotted lines.

Metalens design can involve engineering only the complex phase of light over the nanostructures. Metalens design can use the spatially variant effective refractive index as a design parameter. The spatially variant effective refractive index can be controlled by the nanohole diameter. The real-valued effective refractive index can capture the behavior of both the amplitude and phase of light upon transmission through a meta-element. This design approach can allow for the improvement of device performance beyond what a consideration of transmission phase alone would achieve.

Figure 5:
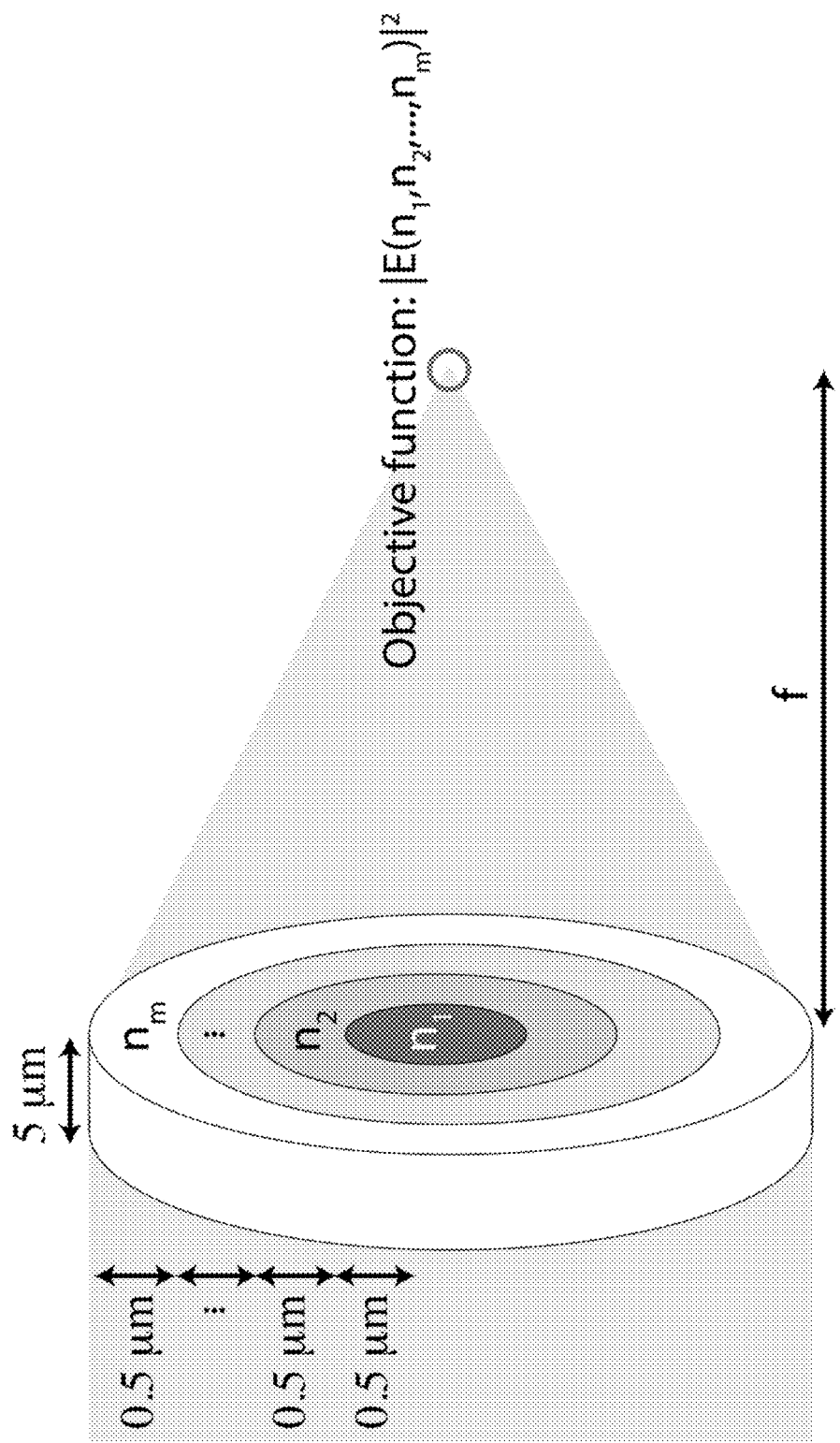
FIG. 5 illustrates a diagram of an optimized geometry of a holey metalens, according to an embodiment.

FIG. 5 illustrates a diagram of an optimized geometry of a holey metalens. The optimum effective refractive index distribution in space can be chosen using an inverse design technique. The metalens surface can be discretized into a series of thin rings of radial thickness 0.5 µm, and the effective index of each thin ring can be treated as an optimization parameter. The objective parameter can be defined to be the intensity of light at the focal point that is computed using a full vectorial diffraction integral. The thick metasurface can be partitioned into m=480 thin rings of radial extension 0.5 µm, and each ring can be associated with one effective index value $n_i$. The electric field at each ring position can be computed using the complex amplitude transmission coefficient associated with each effective index value. The electric field can be propagated to the focal plane using the full vectorial propagator integral. The objective function for the optimization can include the electric field intensity at the focal position. The variable parameters can include the 480 effective index values.

FIGS. 6A-6I illustrate robustness of the holey metalens design to fabrication and spectral imperfections. Although unity transmission can be a resonant phenomenon and resonance behavior can be highly sensitive to boundary conditions, the optical behavior of the nanoholes can be weakly dependent on geometrical perturbations. Systematic fabrication errors that change the geometry of the entire holey metalens device can be studied. Stochastic variations that are spatially distributed over the same device can be studied. The variation of two fabrication parameters on the focusing properties and efficiency of the holey metalens devices and the wavelength of the incident light can be studied. The two fabrication parameters can include the thickness of the membrane and the diameter of the holes. The results of this study are summarized in FIGS. 6A-6I. The focusing quality as measured through the transverse size of the focal spot can remain high under these perturbations. The device efficiency can decrease away from the designed parameter values. These robust behaviors can be attributed to the fact that there is only one dominant Bloch eigenmode associated with each meta-element and that the formed cavity finesse is small ($\mathcal{F}$~2.5) owing to the relatively low reflectivity at the silicon/air interface, which reduces the sensitivity of the resonance.

The effect of systematic over-etching or under-etching of the nanoholes can be studied. The holey metalens system can be tolerant to systematic deviations of the nanohole diameters from the design values as shown in FIGS. 6A-6I. The FWHM of the focal spot can remain constant when the nanohole diameters are systematically perturbed, although the device efficiency can decrease away from the design value. The fabrication tolerance of the holey metalens to systematic variations in the membrane thickness and the hole depth can show similar behavior in which the focal spot quality remains constant when the membrane thickness deviates from the design value. The device efficiency can decrease as the thickness deviates from the design value.

Three types of systematic errors can be considered. For example, membrane thickness variations, spectral variations, and hole diameter variations can be considered. FIG. 6A illustrates membrane thickness variations. FIG. 6B illustrates hole diameter variations. FIG. 6C illustrates spectral variations. FIG. 6D illustrates a plot of the transverse focal spot full-width-at-half-maximum (FWHM) intensity as a function of membrane thickness. The dotted line indicates the design value. FIG. 6E illustrates a plot of the transverse focal spot FWHM intensity as a function of hole diameter variation. The dotted line can indicate zero diameter variation from the design values. FIG. 6F illustrates a plot of the transverse focal spot FWHM intensity as a function of incident wavelength. The dotted line indicates the design value. FIG. 6G illustrates a plot of primary focal spot efficiency as a function of membrane thickness. FIG. 6H illustrates a plot of primary focal spot efficiency as a function of hole diameter variation. FIG. 6I illustrates a plot of primary focal spot efficiency as a function of incident wavelength. Simulations of optimized geometry can indicate larger oscillations of the efficiency with the incident wavelength as plotted in FIG. 6I. The smaller efficiency deviations as a function of wavelength may be attributed to a stochastic fabrication imperfection within the same device.

The holey metalens can have a high fabrication tolerance and robustness compared to metalens with freestanding nanopillars. The variation of fabrication parameters (e.g., the thickness of the membrane, diameter of the holes, the wavelength of incident light) can be studied. For each condition, the focusing profile of the resulting device can be simulated and the intensity FWHM and efficiency can be calculated. The efficiency can be defined as the power flux concentrated within a 20 µm diameter of the optical axis, normalized to the incident power on the lens. The plots of FWHM and efficiency against the three variables are displayed in FIGS. 6A-6I. The FWHM of the focal spot may not change for a wide range of parameters. A systematic error of ±1 µm in membrane thickness, ±100 nm change in hole diameter, and chromatic variations of ±150 nm in spectral space may not change the FWHM of the focal spot. However, these errors can decrease the efficiency of the lens. The lens efficiency can decay in an oscillatory fashion to around 20% when the membrane thickness varies by 1 µm. Oscillatory variations of lens efficiency with wavelength change can be observed. To maintain the efficiency of the holey metalens above half its design value, hole diameters can be fabricated to within ±30 nm of precision.

The transmission behavior and Bloch eigenmodes of pillar and hole arrays can be computed using the Rigorous Coupled Wave Analysis (RCWA) software RETICOLO. The phase of the meta-element can be the complex argument of the transmitted zeroth order amplitude, using the $e^{-i\omega t}$ convention for time harmonicity. The focal spot profiles for a given diameter profile can be computed using the locally periodic approximation, where each hole or pillar meta-element was replaced with the zeroth-order complex transmission amplitude calculated for an infinite periodic array of that meta-element, and the resulting complex amplitude profile can be propagated into free space using a fully vectorial diffraction integral. For numerical optimization, the limited memory Broyden-Fletcher-Goldfarb-Shanno bound constrained optimization algorithm (L-BFGS-B) can be used to maximize the objective parameter with respect to the effective index distribution. Multiple optimization runs can be performed with different starting parameter distributions. Runs can converge to the same configuration suggesting that that the global optimum was reached.

Figure 7:
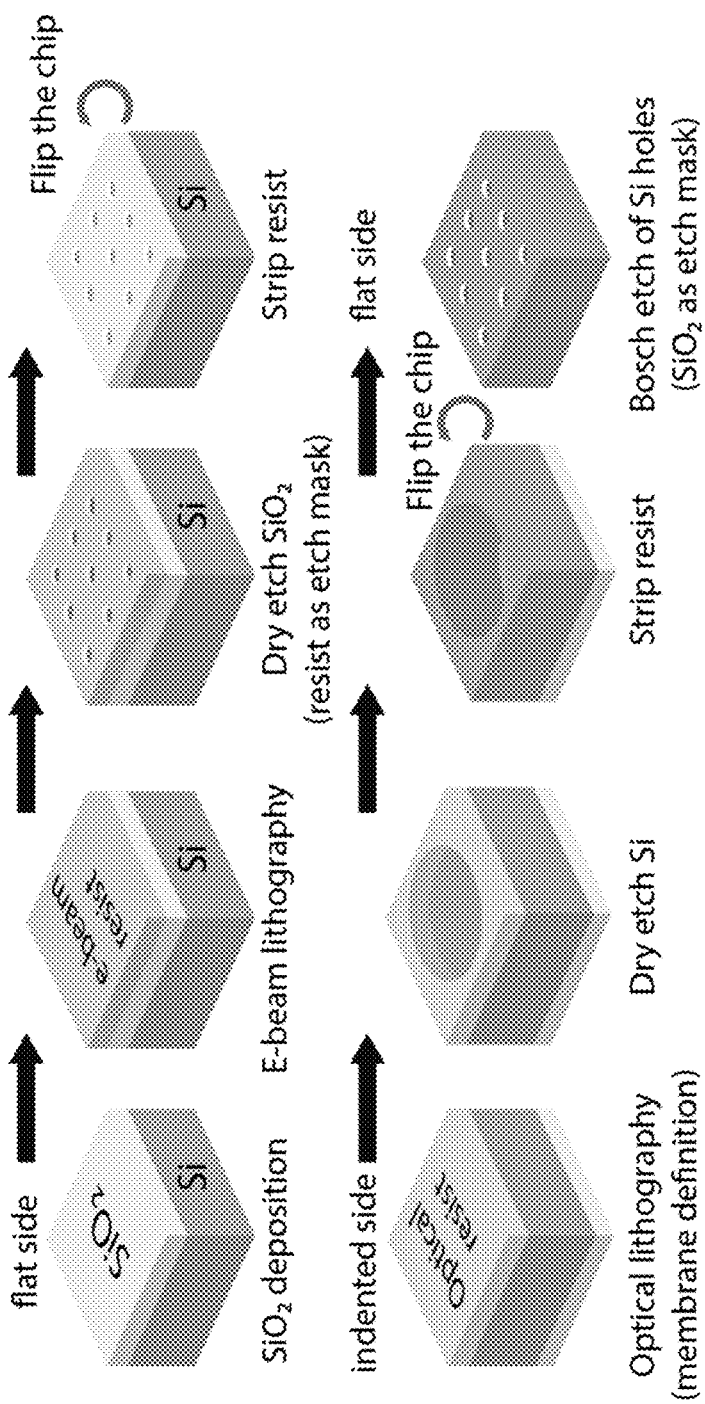
FIG. 7 illustrates a fabrication process for a holey metalens, according to an embodiment.

FIG. 7 illustrates a fabrication process for a holey metalens. In brief overview, electron beam lithography and reactive-ion etching (RIE) steps can be used to pattern a silicon dioxide hard mask on a silicon chip with the desired (e.g., target) holey metalens pattern. The silicon chip can be flipped over, and the silicon directly opposite each pattern can be selectively thinned through RIE dry etching. The process time can be thoroughly controlled to produce thin silicon membranes, each 1.3 mm in diameter with the target thickness of 5 µm. The chip can be flipped back, and deep meta-element via-holes can be etched using a Bosch deep RIE process using the patterned hard mask. First, a $SiO_2$ hard mask layer and electron beam resist layer can be deposited on the Si substrate. The resist layer can be patterned with electron-beam lithography and the pattern can be transferred to the $SiO_2$ layer through dry etching using the resist as an etch mask. Next, the electron beam resist can be removed, and the chip can be flipped. The reverse side of the chip can be coated with optical resist and large circular patterns can be written using a maskless aligner. The exposed silicon in the circle can be dry etched and thinned using the optical resist as an etch mask. This can produce a thin membrane at the base of the circular patterns. Finally, the chip can be flipped back so that the patterned $SiO_2$ hard mask faces up, and the deep high-aspect ratio holes can be etched into the silicon membrane using deep reactive-ion Bosch etching.

Holey metalenses can be fabricated on a 12.7 mm×12.7 mm wafer of undoped crystalline <100> silicon. A 200 nm Sift layer can be deposited onto the 200 μm-thick Si wafer using plasma enhanced chemical vapor deposition (e.g., PECVD, Surface Technology Systems). The $SiO_2$ layer can be patterned through electron beam lithography (e.g., electron beam resist ZEP520A and Elionix HS-50 system) to introduce the circular meta-element patterns. The pattern can be transferred onto the $SiO_2$ layer with inductively coupled plasma reactive ion etching (e.g., ICP RIE, Surface Technology Systems) using the electron beam resist as an etch mask. Argon/tetrafluoromethane/trifluoromethane/hydrogen ($Ar/CF_4/CHF_3/H_2$) can be used for this etch step.

After etching the $SiO_2$ mask, the silicon chip can be flipped over, and 1.3 mm diameter circular membranes can be defined on the opposite side of each metalens pattern using optical lithography and dry etching with the optical resist as an etch mask. In this process, a maskless aligner (e.g., Heidelberg MLA150) can be used to introduce the circular membrane patterns onto a positive photoresist layer (e.g., AZ4620, developed in AZ 400K). The photoresist layer can be used as an etch mask to define the membrane depressions in a deep reactive ion etch (e.g., DRIE, SPTS Technologies, Omega LPX Rapier model). The process time for this dry etch can be tightly controlled to produce thin silicon membranes within each depression, each with the target thickness of 5 μm. Two etching steps can be used in the DRIE process, in which the first "fast" etching recipe is used to etch the bulk of the material down to an estimated remaining membrane thickness of 8 μm. This step can alternate deposition steps with octafluorocyclobutane (CIF's) and etch steps with sulfur hexafluoride ($SF_6$) gas. The second process can be used to etch the membrane more slowly to reach the desired thickness of 5 μm. This etching process can include a continuous etch using a combination of $C_4F_8$ and $SF_6$. The membrane thickness can be monitored intermittently during the etching process with non-contact scanning white light interferometry (e.g., Taylor Hobson, CCI HD) based on the known starting thickness of the silicon wafer.

After the circular membrane structure has been etched down to the desired design thickness, the deep meta-element via-holes can be etched using a Bosch process with alternating cycles of deposition with CIF's, dry etching in oxygen, and dry etching in $SF_6$. The patterned $SiO_2$ on the opposite side of the membrane structure can be used as a hard mask for this Bosch process. During the etching process, the $SiO_2$ mask can be slowly etched away from the substrate, leaving approximately 20 nm of $SiO_2$ upon completion.

For focal spot measurements, a supercontinuum laser (NKT Photonics SuperK) with a laser-line tunable bandpass filter (NKT Photonics LLTF Contrast, bandwidth <5 nm) can be used for illumination. The expanded and collimated laser output from a single-mode fiber can be passed through a 500 μm diameter aperture and normally incident on the indented side of the holey metalens array. The diameter of the aperture can be larger than the diameter of the holey metalens. The holey metalens focal plane can be imaged using a microscope objective (e.g., 50× Mitutoyo Plan Apo NIR HR), tube lens (e.g., Thorlabs TTL180-A), and a near-infrared camera (e.g., Raptor Photonics OW1.7-VS-CL-640). The spatial coordinates of the microscope imaging system can be calibrated by imaging the divisions on a microscope stage calibration slide at the same wavelength. For each lens, four intensity cross sections can be extracted. The Strehl ratios and FWHMs obtained over the four values can be averaged to give the parameter uncertainty. Each extracted cross section can be normalized to ensure that the same energy is concentrated within the given transverse area.

For efficiency measurements, an expanded 1.55 μm laser beam can be passed through a 500 μm aperture to selectively illuminate each 480 μm diameter holey metalens device. A 20 μm diameter aperture (the Airy disk diameter is 8.2 μm) can be placed in the focal plane to block out light around the focal spot. The focal spot and incident laser power values can be measured directly using a laser power meter (e.g., Thorlabs S132C) placed after the 20 μm aperture. The nanostructures can be imaged using scanning electron microscopy (e.g., Zeiss FESEM Ultra Plus) and focused ion beam microscopy (e.g., FIB, FEI Helios 660).

Figure 8B:
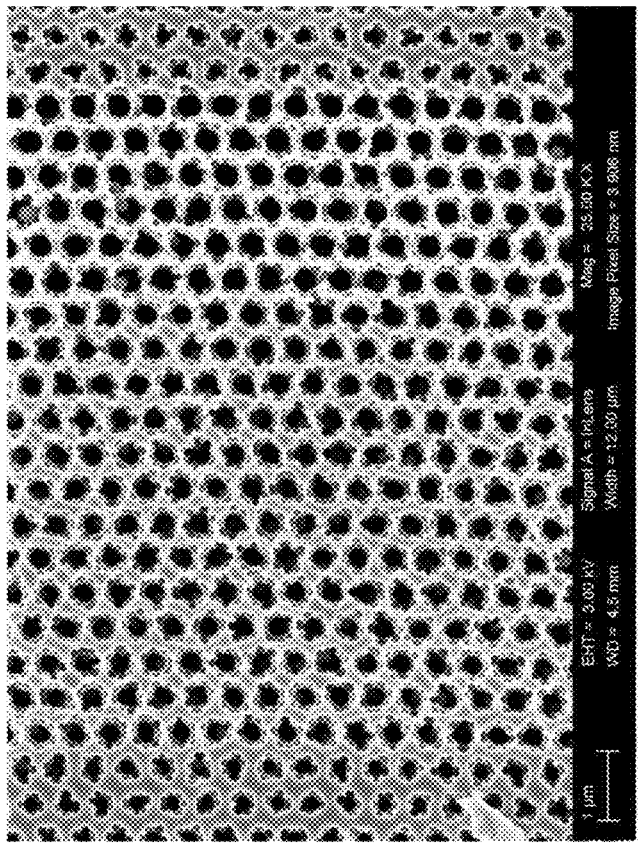
FIGS. 8A-8B illustrate scanning electron microscope (SEM) images of the hole structure of the holey metalens, according to an embodiment.
Figure 8A:
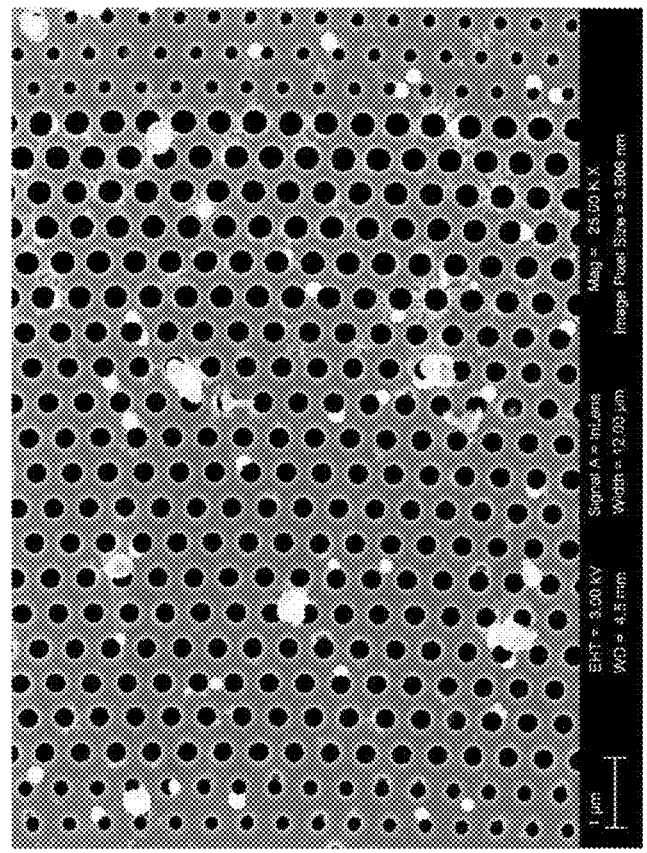

FIGS. 8A-8B illustrate scanning electron microscope (SEM) images of the hole structure of the holey metalens 100. High resolution micrographs of the hole structures on both sides of the chip for lens 6 are shown. FIG. 8A illustrates the hole structures on the indented (thinned) side. FIG. 8B illustrates the hole structures on the flat ($SiO_2$ mask) side.

Figure 9:
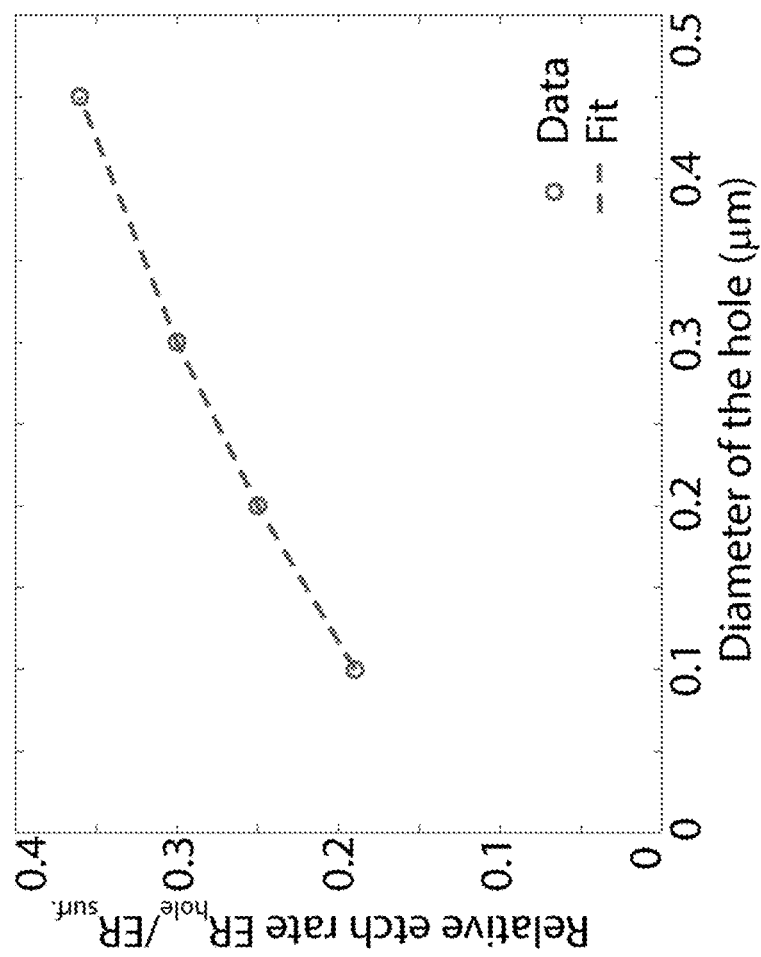
FIG. 9 illustrates a plot of relative etch rate vs. hole diameter, according to an embodiment.

FIG. 9 illustrates a plot of relative etch rate vs. hole diameter. The relative deep reactive-ion Bosch etch rate can be measured for various hole diameters within a uniform hole array. The etch rate can be normalized to that of an open surface. The fitted line (e.g., second order polynomial) can be plotted as the dotted line. A nonlinear dependence of Si etch rate with the nanohole diameter can be observed. The etch rate dependence is plotted in FIG. 9. To ensure that the smallest nanoholes with the slowest etch rate are etched all the way through the 5 μm membrane, the number of cycles for this etch step can be chosen based on the smallest feature diameter in the design. The use of via-holes through a thin membrane, as opposed to holes with only one open end, can remove the effect of this aspect ratio-dependent etch rate and can ensure that all the nanoholes have the same depth, despite the design comprising holes of various diameters.

Figure 10:
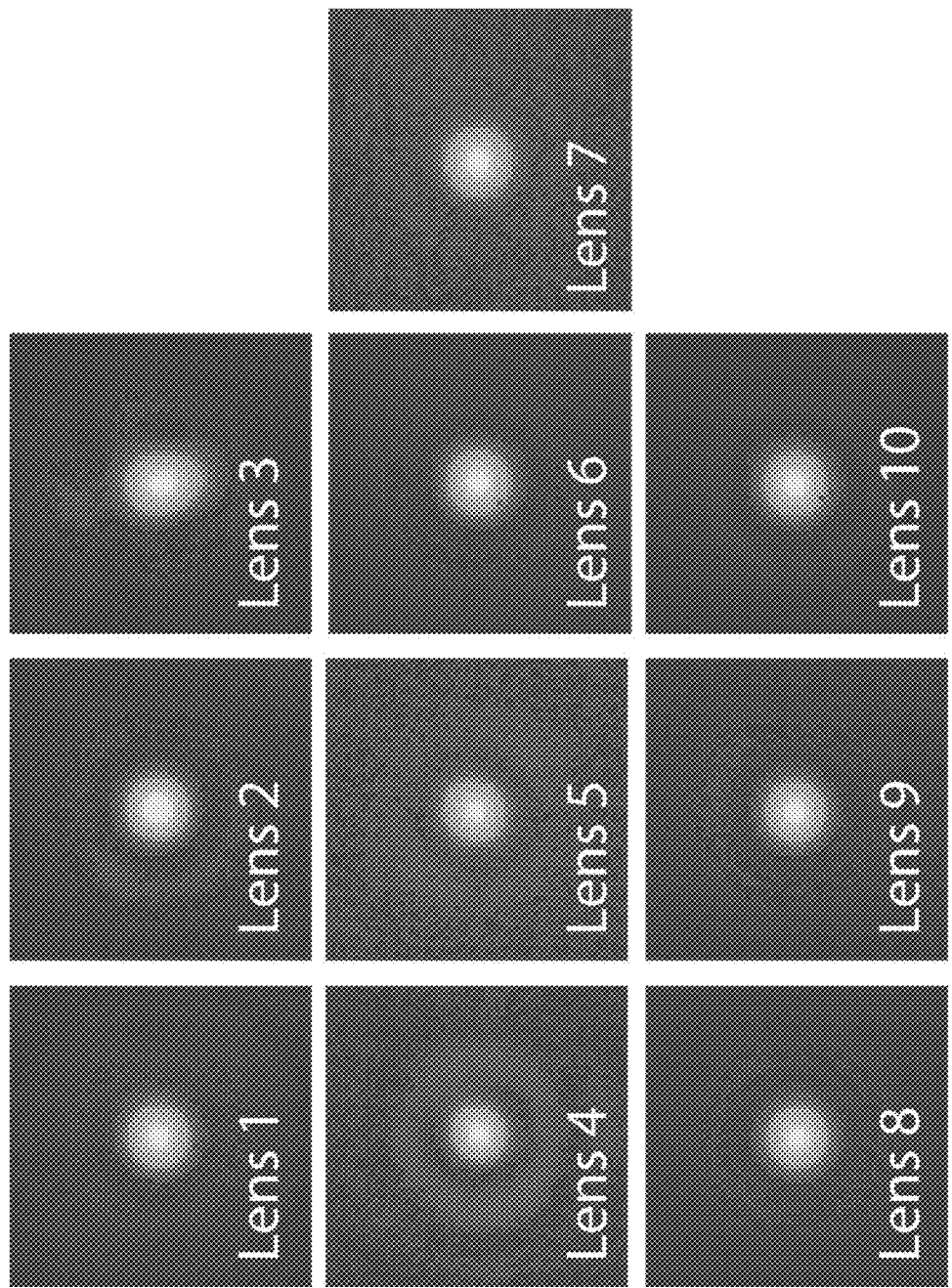
FIG. 10 illustrates the focal spot profiles for ten experimental devices, according to an embodiment.

FIG. 10 illustrates the focal spot profiles for ten experimental devices, according to an embodiment. The ten experimental devices include lens 1, lens 2, lens 3, lens 4, lens 5, lens 6, lens 7, lens 8, lens 9, and lens 10.

Figure 11:
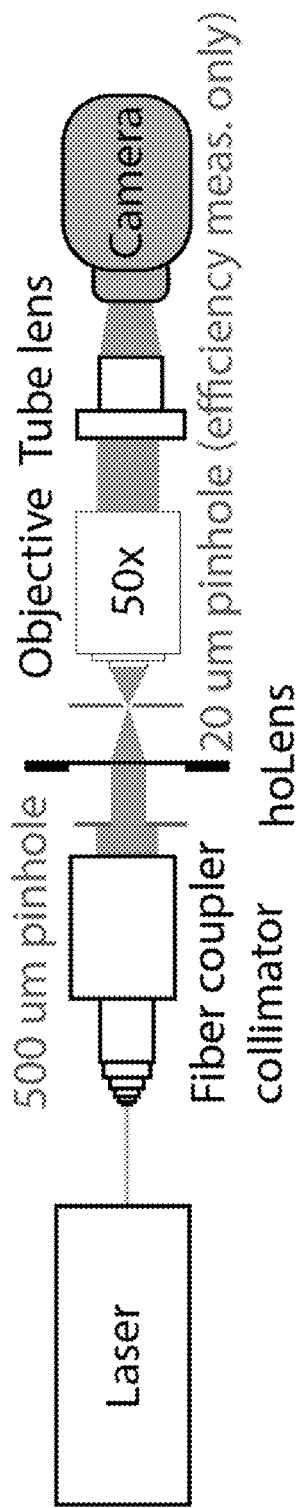
FIG. 11 illustrates an experimental setup for imaging of focal spot and efficiency measurements, according to an embodiment.

FIG. 11 illustrates an experimental setup for imaging of focal spot and efficiency measurements. The experimental setup can be used to characterize the optical transmission properties of the fabricated holey metalens array. Each holey metalens can be illuminated by a plane wave with approximately the same diameter as the lens, and the transmitted light focal plane can be imaged using a microscope. The focused spot at the focal plane of each holey metalens can correspond to the point-spread-function from a point source placed at infinity, since such a point source can produce an illuminating plane wave. The 20 µm pinhole can be in place for efficiency measurements.

A supercontinuum laser (e.g., NKT Photonics SuperK) with a laser-line tunable bandpass filter (e.g., NKT Photonics LLTF Contrast, bandwidth <5 nm) can be used for illumination. The laser beam can be collimated to produce a Gaussian spot with a diameter of 4 mm, which can be much larger than the 480 µm diameter of each holey metalens. The beam size can be reduced by passing the beam through a 500 µm pinhole (e.g., Thorlabs P500D) before it is incident on each holey metalens. The beam is focused by the holey metalens 100 and the focal plane can be imaged with a 50× microscope (e.g., 50× Mitutoyo Plan Apo NIR HR Infinity Corrected Objective and Thorlabs TTL180-A tube lens) and NIR camera (e.g., Raptor OW1.7-VS-CL-640). Object sizes in the microscope can be calibrated by imaging a reference reticle comprising tick marks spaced 10 µm apart using the incident beam wavelength of 1550 nm.

Figure 12:
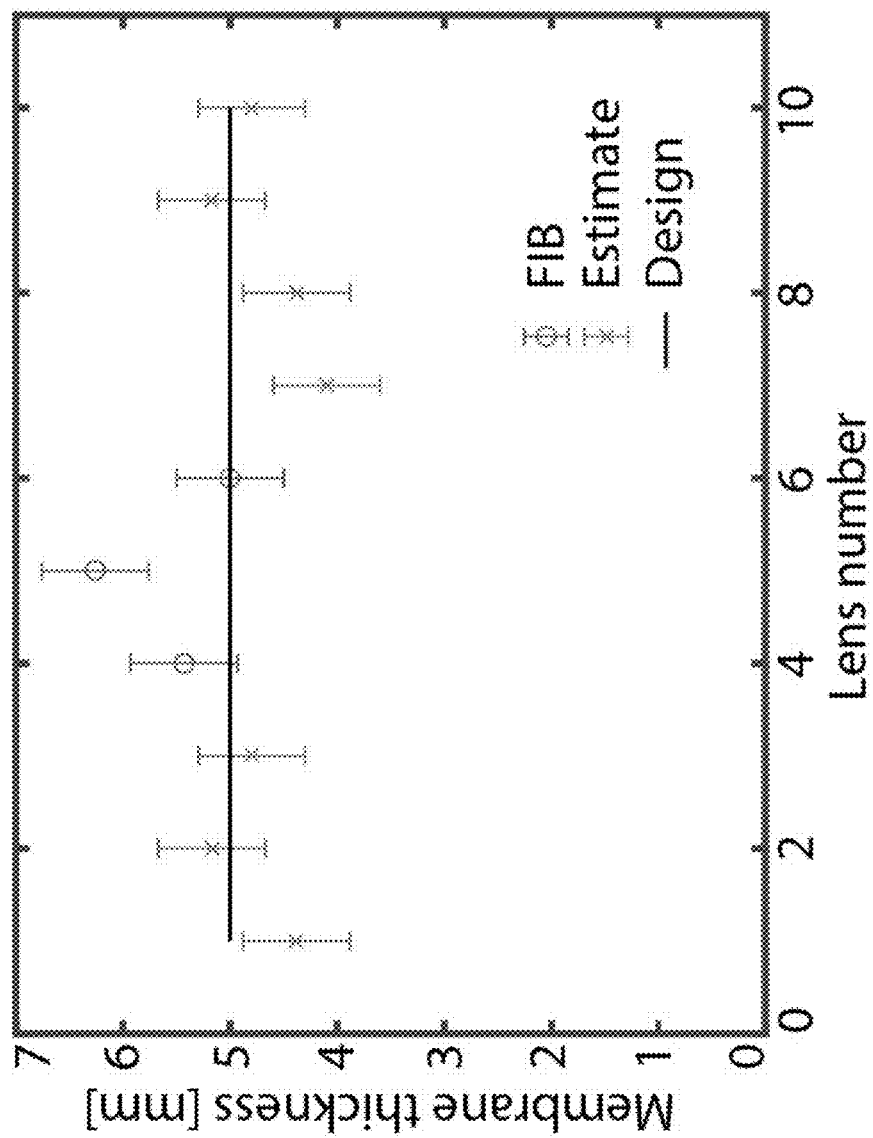
FIG. 12 illustrates a plot of membrane thickness vs. lens number for ten experimental devices, according to an embodiment.

FIG. 12 illustrates a plot of membrane thickness vs. lens number for ten experimental devices (lens 1, lens 2, lens 3, lens 4, lens 5, lens 6, lens 7, lens 8, lens 9, and lens 10). The differences in optical behavior between the lenses can occur because each of the ten lenses were fabricated using different doses during electron beam lithography and thus have different diameter profiles. Scanning electron microscopy can be used to directly measure the nanohole sizes in each holey metalens sample to simulate the expected complex amplitude at each position and hence the focusing profiles in the focal plane. The experimental focal spots for each of the ten lenses fabricated under plane wave illumination at λ=1550 nm is shown in FIG. 12. FIG. 12 illustrates the thickness of fabricated membranes. The membrane thickness for ten lenses (lens 1, lens 2, lens 3, lens 4, lens 5, lens 6, lens 7, lens 8, lens 9, and lens 10) are shown. FIG. 12 illustrates the thickness of the fabricated membranes for each holey metalens device in comparison to the designed value of 5 µm. The thickness of lens 4, lens 5, and lens 6 can be directly measured by focused ion beam (FIB) milling. The thicknesses of the other devices can be deduced based on these three thickness measurements and measurements of the relative silicon dry etch rate over the entire chip. To measure the thickness of the fabricated membranes, a focused ion beam (e.g., FIB, FEI Helios 660) can be used to mill through the membrane immediately adjacent to three of the ten fabricated devices (lenses 4, 5, and 6 in the FIG. 3A inset). The cross-sectional thicknesses can be measured with scanning electron microscopy. The membrane thicknesses for the other devices can be estimated indirectly based on these three measurements. This can be performed based on direct white-light interferometry (e.g., Taylor Hobson CCI HD) measurements of the relative silicon etch rate over the entire device during the membrane dry etching process.

Figure 13:
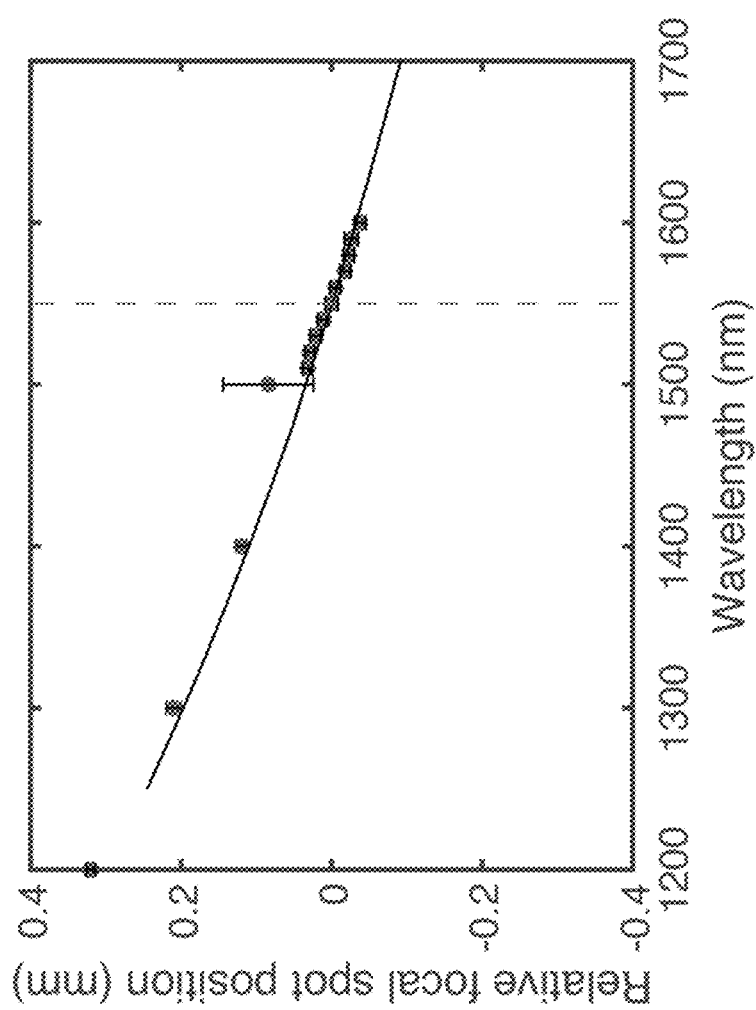
FIG. 13 illustrates a plot of relative focal spot position vs. wavelength, according to an embodiment.

FIG. 13 illustrates a plot of relative focal spot position vs. wavelength. The focal distance as a function of wavelength is shown. This is compared to the simulated results for lens 6. The spectral behavior of the lens can be in agreement with the simulated data. The focal spot can become shorter with a wavelength, such as in a diffractive lens. FIG. 13 illustrates the relative focal spot position along the optical axis, relative to the focal spot position at λ=1550 nm, for a range of incident wavelengths for lens 6. There can be agreement with the numerically simulated focal shift values (plotted as the solid line).

Figure 14:
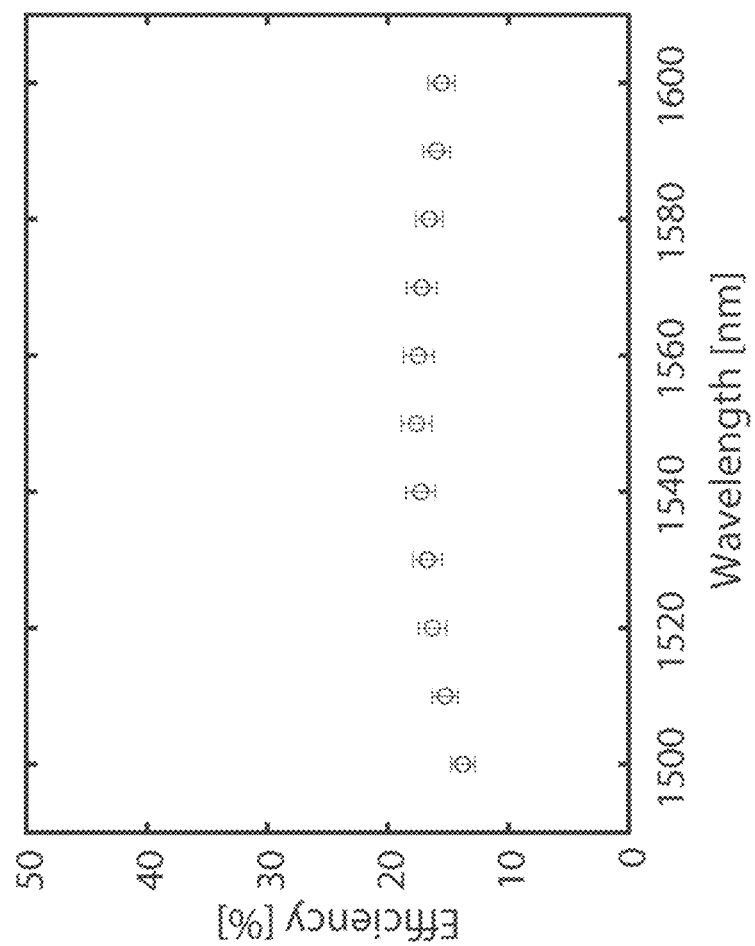
FIG. 14 illustrates a plot of efficiency vs. wavelength, according to an embodiment.

FIG. 14 illustrates a plot of efficiency vs. wavelength. Efficiency measurements as a function of incident wavelength can be plotted. There can be a weak dependence of efficiency on wavelength. The maximum efficiency can be achieved at the design wavelength of 1550 nm and can decrease away from the design wavelength. FIG. 14 illustrates experimental efficiency measurements of lens 6 plotted as a function of incident wavelength.

Figure 15A:
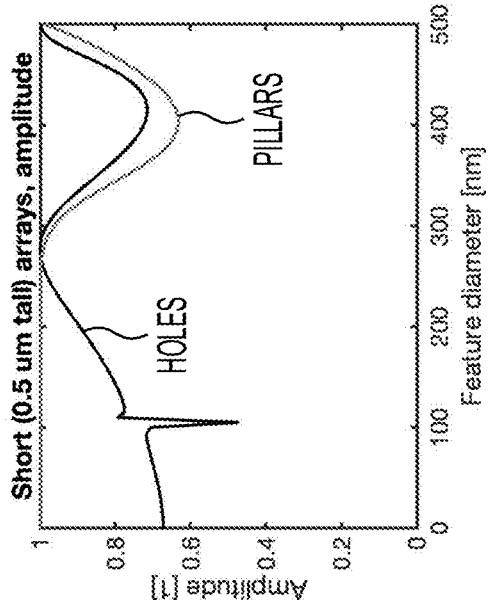
FIGS. 15A-15D illustrate phase and amplitude dependence of hole meta-atoms and pillar meta-atoms onto the nanostructure geometry, according to an embodiment.
Figure 15B:
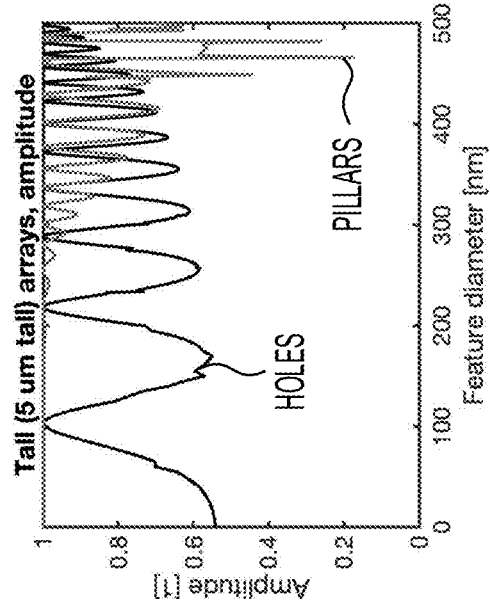
Figure 15C:
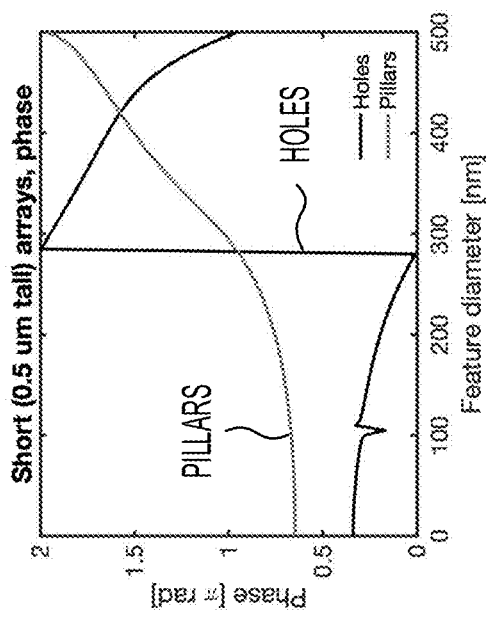
Figure 15D:
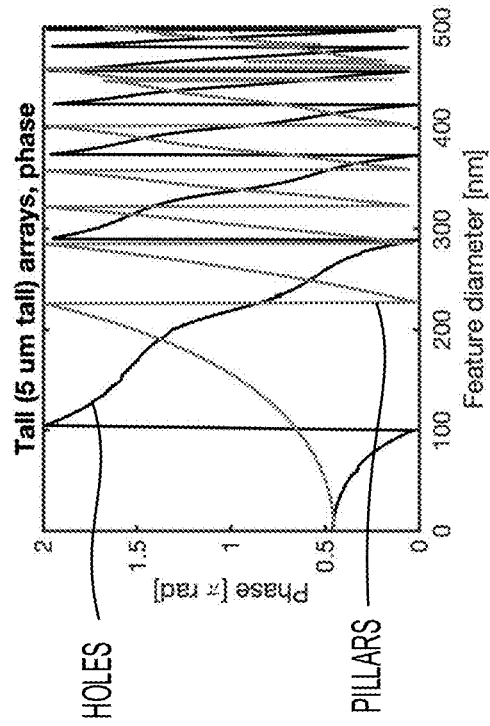

FIGS. 15A-15D illustrate phase and amplitude dependence of hole meta-atoms and pillar meta-atoms onto the nanostructure geometry. FIGS. 15A and 15B depict short (e.g., 500 nm) holes and pillars. FIGS. 15C and 15D depict tall (e.g., 4 µm) holes and pillars, respectively. FIG. 15A illustrates the transmitted phase for pillar and hole arrays of 500 nm height. FIG. 15B illustrates amplitude (relative to the incident amplitude) for structures of 500 nm height. FIG. 15C illustrates transmitted phase for pillar and hole arrays of 5 µm height. FIG. 15D illustrates amplitude (relative to the incident amplitude) for structures of 5 µm height.

For the same unit cell periodicity, increasing the diameter of pillar-like structures can increase the phase delay (relative to an incident plane wave) imposed on transmitted light as more light is confined within the high refractive index material. Conversely, increasing the diameter of hole-like structures can have the opposite effect where the phase delay decreases, since less light remains within the low refractive index air material. The phase behaviors of circular pillar and hole structures as computed by RCWA are compared in FIG. 15A (for 500 nm tall structures) and FIG. 15C (for 5 µm tall structures). While the phase variation as a function of structure diameter can appear similar up to a change in direction for the transmitted phase, the amplitude of the transmitted light can exhibit qualitative differences in pillar and hole arrays. For pillar-like structures, the transmitted amplitude (relative to the amplitude of incident light) can remain high and approximately constant for small diameters (FIG. 15B for 500 nm tall structures and FIG. 15D for 5 µm tall structures). Pillar-like meta-atoms that span the full 2π radian phase range and that have similar transmission efficiencies can be selected. However, for hole-like structures, the transmitted amplitude can exhibit large variations with hole diameter, especially for small holes. The maxima in amplitude that reaches unity can correspond to the Fabry-Perot resonances of the dominant Bloch eigenmode. The transmitted amplitude can be strongly correlated to the transmitted phase. The maxima in amplitude can coincide with a phase delay of 0 or 2π radians, and the minima in amplitude can correspond to phase delays of $$\frac{\pi}{2} \text{ or } \frac{3\pi}{2}$$

radians. Thus, a range of hole-like meta-atoms that span the full 2π phase range and have constant transmission efficiency may not be selectable. The pillar-like meta-atoms can also exhibit this correlation between phase and amplitude values, but the fluctuations in transmission amplitude with pillar diameter can be small and negligible.

The strong correlation of phase and amplitude for hole-like meta-atoms can suggest that there will be low-efficiency hole-like meta-atoms for phase delays around $$\frac{\pi}{2} \text{ or } \frac{3\pi}{2}$$

radians. For phase profiles such as the hyperbolic lens phase profile, which may require phase delays across the full 0 or 2π radians range, these low meta-element efficiencies can reduce the overall device efficiency.

Amplitude fluctuations with feature diameter can be understood in terms of Bloch eigenmodes (e.g., leaky modes). The electromagnetic field distribution in any lossless structure with transverse periodic boundary conditions can be written as a linear combination of these eigenmodes. Bloch eigenmodes can be parametrized by the effective index $n_{eff}$, which is proportional the rate of phase accumulation $n_{eff}k_0$ in the direction of propagation orthogonal to the plane with periodicity. Propagating Bloch eigenmodes can contribute to transmissive optical behavior since they may not be attenuated upon propagation through the structure. If there is only one propagating Bloch eigenmode and the layer H is much thicker than the exponential decay length of the evanescent modes, then the system can be in the effective medium regime in which the optical properties can be predicted by replacing the structure with a uniform slab of refractive index equal to $n_{eff}$. In particular, the complex transmission coefficient can be written using the Fabry-Perot formalism as:

$$t_{FP} = \frac{4(n_{eff}/n_0)e_2^{in_{eff}k_0H}}{(n_{eff}/n_0+1)^2 - (n_{eff}/n_0-1)^2 e^{2in_{eff}k_0H}} \quad (2)$$

For the parameter range studied in silicon with a vacuum wavelength of 1.55 μm, every Bloch mode with an imaginary effective index can have a characteristic exponential decay length under 12 nm, thus the imaginary effective index Bloch modes (evanescent modes) can contribute minimally to optical transmission properties through thick structures exceeding hundreds of nanometers.

FIGS. 16A-16B illustrate eigenmode properties for a periodic hole array and a periodic cylindrical pillar array. FIG. 16A illustrates the eigenmode properties for the periodic hole array geometries as a function of the normalized periodicity P (to the incident vacuum wavelength k) and the normalized diameter D (to P). FIG. 16B illustrates the eigenmode properties for the periodic cylindrical pillar array geometries as a function of the normalized periodicity P (to the incident vacuum wavelength k) and the normalized diameter D (to P). The surface plots illustrate prediction error in the complex transmission coefficient t when using a single FP mode as compared to the full calculation from RCWA. The contour plots illustrate the number of propagating Bloch eigenmodes $N_{prop}$.

The Bloch mode characteristics of hole and pillar arrays are plotted in FIGS. 16A and 16B, respectively. Square-periodic hole and pillar arrays parametrized by the normalized periodicity P (to the vacuum wavelength of incident light $\lambda_0$=1.55 μm) and the normalized feature diameter D (to the periodicity) are considered. The contour plot can show the number of propagating Bloch eigenmodes for each (D, P) combination for the silicon/air platform. For small periodicities approximately around P<0.3 (P<0.28 for holes and P<0.31 for pillars), the array only supports one propagating mode, indicating that the system is in the effective medium regime. This single-mode regime can occupy a larger fraction of the (D, P) phase space for pillar arrays as compared to hole arrays. As the amount of material (e.g., silicon) increases (P→1, D→0 for hole arrays or P→1, D→1 for pillar arrays), the number of propagating modes can also increase.

To examine the validity of this effective medium regime approximation over the (D, P) phase space, the predicted complex transmission coefficient using the largest Bloch mode $n_{eff}$ for a slab thickness of 5 μm can be computed. This can be compared with the true value $t_{RCWA}$ (for the zeroth transmitted order) obtained with 256 plane waves in a RCWA computation. The surface plots in FIGS. 16A and 16B plot the deviation value of $|t_{RCWA}-t_{FP}|$ over the (D, P) phase space for hole and pillar arrays, respectively. This deviation may be small in the few-propagating-mode regime and small in the small-hole diameter regime, despite the number of propagating Bloch modes being large for large periodicities. This can be indicative of the small-hole arrays having only one dominant Bloch eigenmode into which most of the incident energy is coupled, so these arrays can also be treated using the effective medium formalism.

FIG. 16C illustrates a plot of propagating Bloch eigenmode effective refractive indices as a function of pillar or hole diameter for the case where λ=1550 nm, P=500 nm=0.32λ. The inset plots exhibit the eigenmode electric field intensity distributions $|\vec{E}|^2$ for the labelled eigenmodes. The dominant Bloch mode can correspond to the branch with the highest refractive index in this regime. FIG. 16C illustrates a plot of the effective index of the hole and pillar modes as a function of the feature diameter for the case where P=0.32λ=500 nm. This periodicity can correspond to that used in this holey metalens design for $\lambda_0$=1.55 μm. In both hole and pillar cases, the dominant Bloch mode can correspond to the band with the highest effective index displayed. The electric field intensity $|\vec{E}|^2$ distribution for each mode is displayed within the figure insets.

FIG. 16D illustrates complex transmission coefficient (phase and absolute efficiency) dependence on hole diameter for the hole array where λ=1550 nm, P=500 nm=0.32λ. Crosses represent full RCWA computations with many eigenmodes and lines represent predictions using the dominant Bloch eigenmode effective index alone. The correspondence between the FP predictions and RCWA calculations can indicate that the hole array is well-approximated by the behavior of the dominant Bloch eigenmode.

The dominant Bloch mode effective index can be used to predict the transmission phase and amplitude for the hole array with P=0.32$\lambda_0$=500 nm. In FIG. 16D, the RCWA-computed transmission phase and amplitude is plotted against the hole diameter, and compared with those predicted based on the dominant Bloch mode effective index substituted into the Fabry-Perot approximation. The close correspondence between the two methods can indicate that the complex transmission amplitude can be well-approximated by the Fabry-Perot transmission formula, despite the hole array exhibiting more than one propagating eigenmode for small diameters. The single real value of the dominant Bloch mode effective index can capture the combined behavior of both transmitted phase and amplitude simultaneously.

The insight that meta-atoms can be replaced with their corresponding effective index can allow for the engineering of devices that require a spatially variant refractive index. The optimal spatially variant refractive index profile can be identified for a flat lens that produces a diffraction limited spot. This can be a paradigm shift in viewing these hole-like meta-atoms. Instead of being inferior elements for enforcing a phase delay (due to their low transmission efficiencies at specific phase delays), they function as a way for enforcing a local effective index.

Figure 17B:
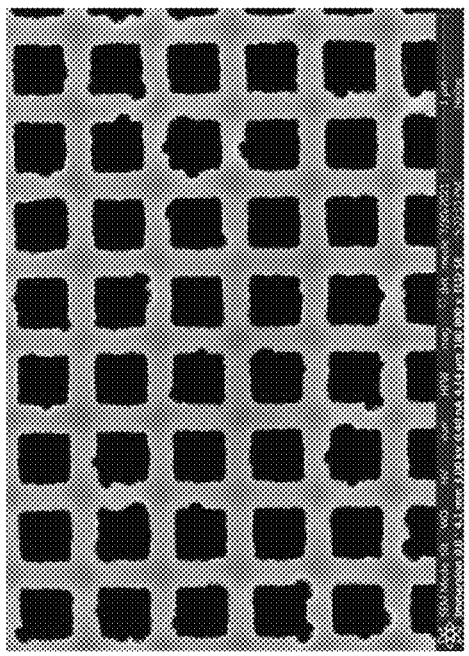
FIGS. 17A-17D illustrate scanning electron micrographs of holey metalens arrays with various hole shapes, according to an embodiment.
Figure 17D:
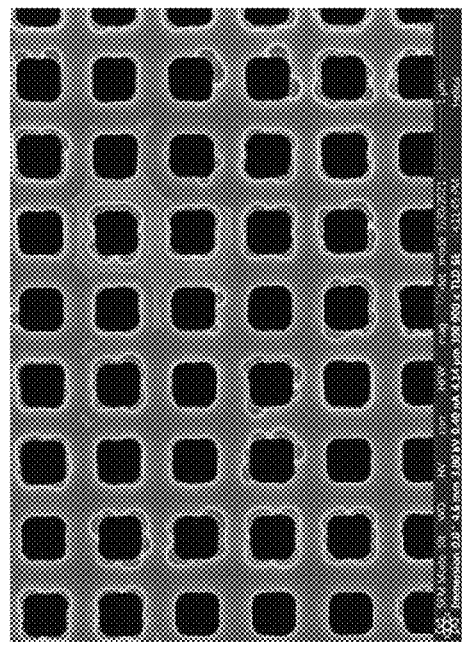
Figure 17A:
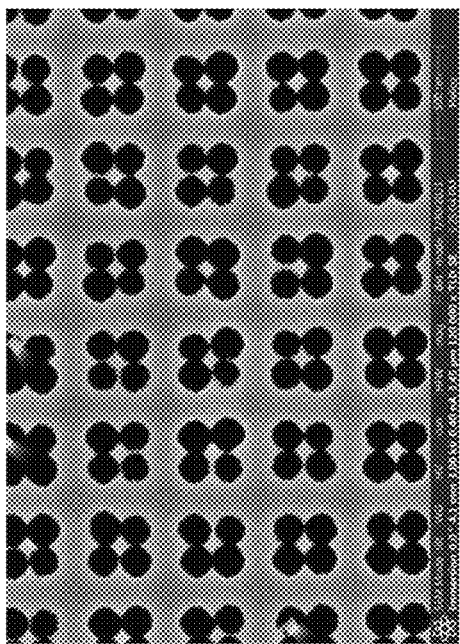
Figure 17C:
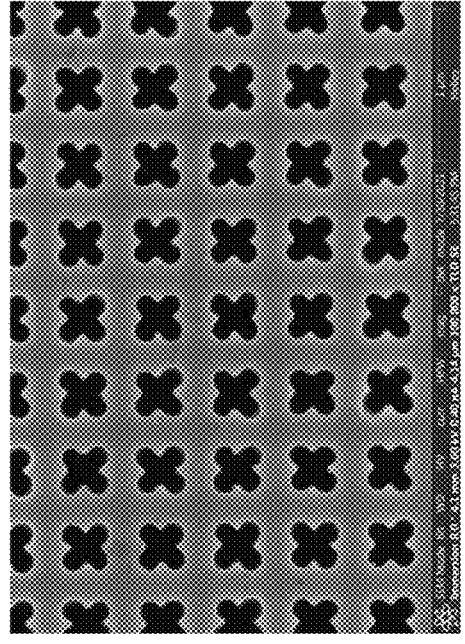

FIGS. 17A-17D illustrate scanning electron micrographs of holey metalens arrays with various hole shapes. The plurality of apertures can have various shapes. For example, the plurality of apertures can have a shape such as a square, ellipse, circle, cross, square with rounded corners, rectangle, triangle, or other shape. The plurality of aperture can have anisotropic structures to allow for the optical device or holey metalens 100 to have polarization functionality. Polarization functionality can include the capability of changing the polarization of incoming light (e.g., reflecting or transmitting polarized light). FIG. 17A illustrates a periodic array of hole clusters (e.g., clusters of holes or apertures). The clusters of holes can include a plurality of apertures. For example, the clusters of holes can include four holes arranged with the center of each hole at the corner of a square. The clusters of holes can be separated by the separation distance. The clusters of holes can include the plurality of apertures 104 extending at least partially through a thickness of the membrane 102. FIG. 17B illustrates a periodic array of square apertures. The square apertures can include the plurality of apertures 104 extending at least partially through a thickness of the membrane 102. The plurality of apertures 104 can be separated by the separation distance. FIG. 17C illustrates a periodic array of cross-shaped apertures. The cross-shaped apertures can include the plurality of apertures 104 extending at least partially through a thickness of the membrane 102. The plurality of apertures 104 can be separated by the separation distance. FIG. 17D illustrates a periodic array of square apertures. The square apertures can include the plurality of apertures 104 extending at least partially through a thickness of the membrane 102. The plurality of apertures 104 can be separated by the separation distance.

As used herein, the singular terms "a," "an," and "the" may include plural referents unless the context clearly dictates otherwise. Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical device, comprising:
   a non-metallic membrane comprising a plurality of apertures extending at least partially through a thickness of the non-metallic membrane, configured to:
       structure incoming light having a wavelength to produce modified light, wherein the wavelength of the incoming light in vacuum is in a range from ultraviolet light to mid-infrared light; and
       transmit the modified light through the non-metallic membrane or reflect the modified light away from the non-metallic membrane;
   wherein a separation between each of the plurality of apertures is subwavelength relative to the wavelength of the incoming light;
   wherein a width of each of the plurality of apertures is subwavelength relative to the wavelength of the incoming light; and
   wherein a length of each of the plurality of apertures is wavelength-scale relative to the wavelength of the incoming light.

2. The optical device of claim 1, wherein:
   the non-metallic membrane comprises a first surface and a second surface; and
   the plurality of apertures each has an opening in a plane defined by the first surface and has another opening in a plane defined by the second surface.

3. The optical device of claim 1, wherein:
   the non-metallic membrane comprises a first surface and a second surface; and
   the plurality of apertures each has an opening in a plane defined by the first surface and lacks an opening along a plane defined by the second surface.

4. The optical device of claim 1, wherein the non-metallic membrane is configured to operate in transmission or reflection as at least one of a converging lens, a diverging lens, a cylindrical lens, a corrector of optical aberrations of a second optical element, a diffraction grating, or a waveplate.

5. The optical device of claim 1, wherein one or more optical properties is constant at a plurality of incident wavelengths.

6. The optical device of claim 1, wherein a phase profile of the modified light produces focusing of incident light at a plurality of wavelengths with a same focal length.

7. The optical device of claim 1, wherein a phase profile of the modified light produces diffracted orders with a same diffraction angle at a plurality of wavelengths.

8. The optical device of claim 1, wherein at least 10% of the plurality of apertures has a length to width aspect ratio of at least 25:1 or at least 100:1.

9. The optical device of claim 1, wherein the length of each of the plurality of apertures is slanted relative to a plane surface of the non-metallic membrane.

10. The optical device of claim 1, further comprising:
    a filler material disposed in the plurality of apertures.

11. The optical device of claim 1, wherein the modified light includes light with at least one of a modified optical phase profile, modified amplitude profile, or modified polarization profile.

12. The optical device of claim 1, wherein the incoming light has a first polarization profile and the modified light has a second polarization profile.

13. The optical device of claim 1, wherein the incoming light has a first wavelength and the modified light has a second wavelength.

14. The optical device of claim 1, wherein the incoming light exerts an optical force upon transmission or reflection.

15. The optical device of claim 1, wherein each of the plurality of apertures has non-cylindrical symmetry.

16. The optical device of claim 1, wherein a cross-sectional profile of a first aperture of the plurality of apertures varies over a length of the first aperture.

17. The optical device of claim 1, wherein the non-metallic membrane is mounted onto at least one of a flat solid substrate or a curved solid substrate to provide structural support.

18. The optical device of claim 1, wherein the non-metallic membrane is a silicon device layer from a silicon-on-insulator (SOI) wafer.

19. The optical device of claim 1, wherein the non-metallic membrane is immersed in a liquid or liquid crystal medium and configured to operate in the liquid medium or liquid crystal medium.

20. The optical device of claim 1, wherein the non-metallic membrane has a non-zero in-plane curvature.

21. The optical device of claim 1, further comprising a plurality of optical functions for a plurality of light angles of incidence.

22. The optical device of claim 1, wherein the non-metallic membrane is configured to be folded one or more times for storage and unfolded for operation.

23. The optical device of claim 1, wherein the non-metallic membrane is configured to be rolled-up for storage and unrolled for operation.

24. The optical device of claim 1, wherein the non-metallic membrane is a first non-metallic membrane, the optical device further comprising a second non-metallic membrane cascaded in series with the first non-metallic membrane.

25. The optical device of claim 1, wherein the non-metallic membrane is sandwiched between two reflective or partially-reflective layers to produce an optical cavity.

26. The optical device of claim 1, wherein:
    the non-metallic membrane comprises a first surface and a second surface; and
    the first surface is coated with at least one of a solid, a liquid, or a polymeric film.

27. The optical device of claim 1, wherein the plurality of apertures is a first plurality of apertures, the non-metallic membrane further comprising:
- a second plurality of apertures extending at least partially through the thickness of the non-metallic membrane; and
- wherein the non-metallic membrane comprises a first surface and a second surface;
- wherein the first plurality of apertures each has an opening in a plane defined by the first surface and lacks an opening along a plane defined by the second surface; and
- wherein the second plurality of apertures each has an opening in the plane defined by the second surface and lacks an opening along the plane defined by the first surface.

28. The optical device of claim 1, wherein the non-metallic membrane comprises at least one of silicon dioxide, titanium dioxide, calcium fluoride, silicon nitride, silicon carbide, titanium nitride, glass, III-V and II-VI semiconductors, diamond, barium titanate, complex oxides, or perovskite oxides.

* * * * *